US009020211B2

(12) United States Patent
Momoi

(10) Patent No.: US 9,020,211 B2
(45) Date of Patent: Apr. 28, 2015

(54) DATA PROCESSING APPARATUS, CONTROL METHOD THEREFOR, AND NON-TRANSITORY COMPUTER-READABLE STORAGE MEDIUM

(75) Inventor: Akiyoshi Momoi, Bangalore (IN)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 13/469,001

(22) Filed: May 10, 2012

(65) Prior Publication Data

US 2012/0297169 A1 Nov. 22, 2012

(30) Foreign Application Priority Data

May 17, 2011 (JP) ................................. 2011-110825

(51) Int. Cl.
*G06K 9/00* (2006.01)
*G06K 9/62* (2006.01)
(52) U.S. Cl.
CPC .......... *G06K 9/6257* (2013.01); *G06K 9/00973* (2013.01)
(58) Field of Classification Search
CPC ............ G06K 9/36; G06T 7/60; G06T 7/602; B21C 51/00; B21J 9/00
USPC ........... 382/103, 118, 159, 190, 209; 712/207
See application file for complete search history.

(56) References Cited

U.S. PATENT DOCUMENTS

| | | | | |
|---|---|---|---|---|
| 7,103,757 | B1 * | 9/2006 | Kashyap | 712/237 |
| 7,266,254 | B2 * | 9/2007 | Ishikawa et al. | 382/305 |
| 8,526,672 | B2 * | 9/2013 | Momoi | 382/103 |
| 8,611,599 | B2 * | 12/2013 | Natori | 382/103 |
| 8,700,860 | B2 * | 4/2014 | Mise et al. | 711/137 |
| 2001/0003822 | A1 * | 6/2001 | Hibi et al. | 709/100 |
| 2003/0093647 | A1 * | 5/2003 | Mogi et al. | 712/1 |
| 2006/0204103 | A1 * | 9/2006 | Mita et al. | 382/190 |
| 2007/0177807 | A1 * | 8/2007 | Enomoto | 382/224 |
| 2007/0217688 | A1 * | 9/2007 | Sabe et al. | 382/226 |
| 2010/0209010 | A1 * | 8/2010 | Kato et al. | 382/226 |

(Continued)

FOREIGN PATENT DOCUMENTS

| | | |
|---|---|---|
| JP | 2011-86259 | 4/2011 |
| JP | 2011-86263 | 4/2011 |

OTHER PUBLICATIONS

P. Viola et al., "Robust Real-time Object Detection", Second International Workshop on Statistical and Computational Theories of Vision, Jul. 13, 2001.
Japanese Office Action issued on Mar. 6, 2015 during prosecution of related Japanese application No. 2011-110825.

*Primary Examiner* — Aaron W Carter
(74) *Attorney, Agent, or Firm* — Fitzpatrick, Cella, Harper & Scinto

(57) ABSTRACT

A data processing apparatus which sequentially executes a verification process so as to recognize a target object, comprising: an obtaining unit configured to obtain dictionary data to be referred to in the verification process; a holding unit configured to hold a plurality of dictionary data; a verification unit configured to execute the verification process for the input data by referring to one dictionary data; a history holding unit configured to hold a verification result; and a prefetch determination unit configured to determine based on the verification result whether to execute prefetch processing in which the obtaining unit obtains in advance dictionary data to be referred to by the verification unit in a succeeding verification process, and holds the dictionary data in the holding unit before the succeeding verification process.

14 Claims, 17 Drawing Sheets

(56) References Cited

U.S. PATENT DOCUMENTS

| | | | |
|---|---|---|---|
| 2010/0296740 A1* | 11/2010 | Mise | 382/209 |
| 2011/0093667 A1* | 4/2011 | Mise et al. | 711/154 |
| 2012/0051591 A1* | 3/2012 | Natori | 382/103 |
| 2012/0297169 A1* | 11/2012 | Momoi | 712/207 |
| 2013/0236103 A1* | 9/2013 | Hashiguchi | 382/192 |

* cited by examiner

FIG. 17A

PROCESSING RESULT OF FRAME N-1

FIG. 17B

PROCESSING RESULT OF FRAME N

FIG. 18

| ADDRESS OF REGION | A1 | A2 | A3 | A4 | A5 | A6 | ... |
|---|---|---|---|---|---|---|---|
| STEP NUMBER | S1 | S2 | S3 | S3 | S4 | S5 | ... |

DATA PROCESSING APPARATUS, CONTROL METHOD THEREFOR, AND NON-TRANSITORY COMPUTER-READABLE STORAGE MEDIUM

BACKGROUND OF THE INVENTION

1. Field of the Invention

The present invention relates to a data processing apparatus, a control method therefor, and a non-transitory computer-readable storage medium and, more particularly, to a data processing apparatus for executing data processing (so-called cascade processing) in which data processing is repeatedly executed for a plurality of input data, and it is determined based on the processing result of the preceding stage whether processing of the succeeding stage is to be executed, a control method for a data processing apparatus, and a non-transitory computer-readable storage medium.

2. Description of the Related Art

There has been conventionally proposed a technique of detecting a specific subject such as a person or face in an input image and executing processing suitable for the detected subject in a digital camera or printer. As an example of the processing of detecting a specific subject, there is face detection processing for executing skin color correction processing for a face.

There have been proposed various methods as face detection processing, such as P. Viola and M. Jones, "Robust Real-time Object Detection", SECOND INTERNATIONAL WORKSHOP ON STATISTICAL AND COMPUTATIONAL THEORIES OF VISION, Jul. 13, 2001 (to be referred to as "Viola & Jones method" hereinafter) and a method of detecting a human face using the symmetric features of a human face, template matching, neural networks, and the like. In the Viola & Jones method, verification processing is executed based on a learning result by AdaBoost. This verification processing is cascade processing as follows. That is, as a result of certain verification processing, TRUE is output when next verification processing is to be executed and FALSE is output when next verification processing is not to be executed. When FALSE is output, the verification processing ends.

In such verification processing, to increase the processing speed while suppressing the circuit scale of an internal memory, a cache method or prefetch method (a method of preparing in advance parameters necessary for a next operation) is widely used as a conventional technique for shortening a processing waiting time required to load parameters such as dictionary data.

The cache method and prefetch method as conventional techniques for increasing the processing speed while suppressing the circuit scale of an internal memory have the following problems.

That is, in the cache method which deletes the oldest dictionary data when a shortage of a storage area occurs, if FALSE is output after steps the number of which is larger than that of parameter storage units are processed, it is always necessary to reload all dictionary data in next input data processing and it is, therefore, impossible to obtain the effects of the cache method at all.

On the other hand, in the prefetch method, dictionary data necessary for a next operation is predicted to be dictionary data for a next step, and is then prefetched. However, in recognition processing, the prediction may turn out to be wrong. In the prefetch method, therefore, corresponding processes are sequentially executed in the order of step numbers.

In this case, for example, if dictionary data 3 is loaded during processing in step 2 and the result of the processing in step 2 is FALSE, the load operation of dictionary data 3 is in vain. Furthermore, dictionary data 1 necessary for a next operation is deleted and, therefore, it takes time to reload dictionary data 1.

The present invention has been made in consideration of the above problems. The present invention provides a technique of increasing the processing speed while suppressing the circuit scale of an internal memory.

SUMMARY OF THE INVENTION

According to one aspect of the present invention, there is provided a data processing apparatus which sequentially executes at least one verification process for each predetermined region in respective one of a plurality of input data by referring to dictionary data so as to recognize a target object, comprising: an obtaining unit configured to obtain dictionary data to be referred to in the verification process; a holding unit configured to hold a plurality of dictionary data obtained by the obtaining unit; a verification unit configured to execute the verification process for the input data by referring to one dictionary data held in the holding unit; a history holding unit configured to hold a verification result obtained by the verification unit; a prefetch determination unit configured to determine based on the verification result held in the history holding unit whether to execute prefetch processing in which the obtaining unit obtains in advance dictionary data to be referred to by the verification unit in a succeeding verification process, and holds the dictionary data in the holding unit before the succeeding verification process; and a processing unit configured to execute, when it has been determined to execute the prefetch processing, the prefetch processing.

According to one aspect of the present invention, there is provided a control method for a data processing apparatus which includes a holding unit configured to hold a plurality of dictionary data and a history holding unit, and sequentially executes at least one verification process for each predetermined region in respective one of a plurality of input data by referring to dictionary data so as to recognize a target object, the method comprising: obtaining dictionary data to be referred to in the verification process; executing the verification process for the input data by referring to one dictionary data held in the holding unit, and registering a verification result in the history holding unit; determining based on the verification result held in the history holding unit whether to execute prefetch processing in which dictionary data to be referred to in a succeeding verification process in the executing the verification process is obtained in advance in the obtaining, and is held in the holding unit before the succeeding verification process; and executing, when it has been determined to execute the prefetch processing, the prefetch processing.

Further features of the present invention will be apparent from the following description of exemplary embodiments with reference to the attached drawings.

BRIEF DESCRIPTION OF THE DRAWINGS

FIGS. 17A and 17B are views for explaining the correlation between the processing results of frame images; and FIG. 18 is a table for explaining the processing result of the preceding frame image according to the present invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 5:
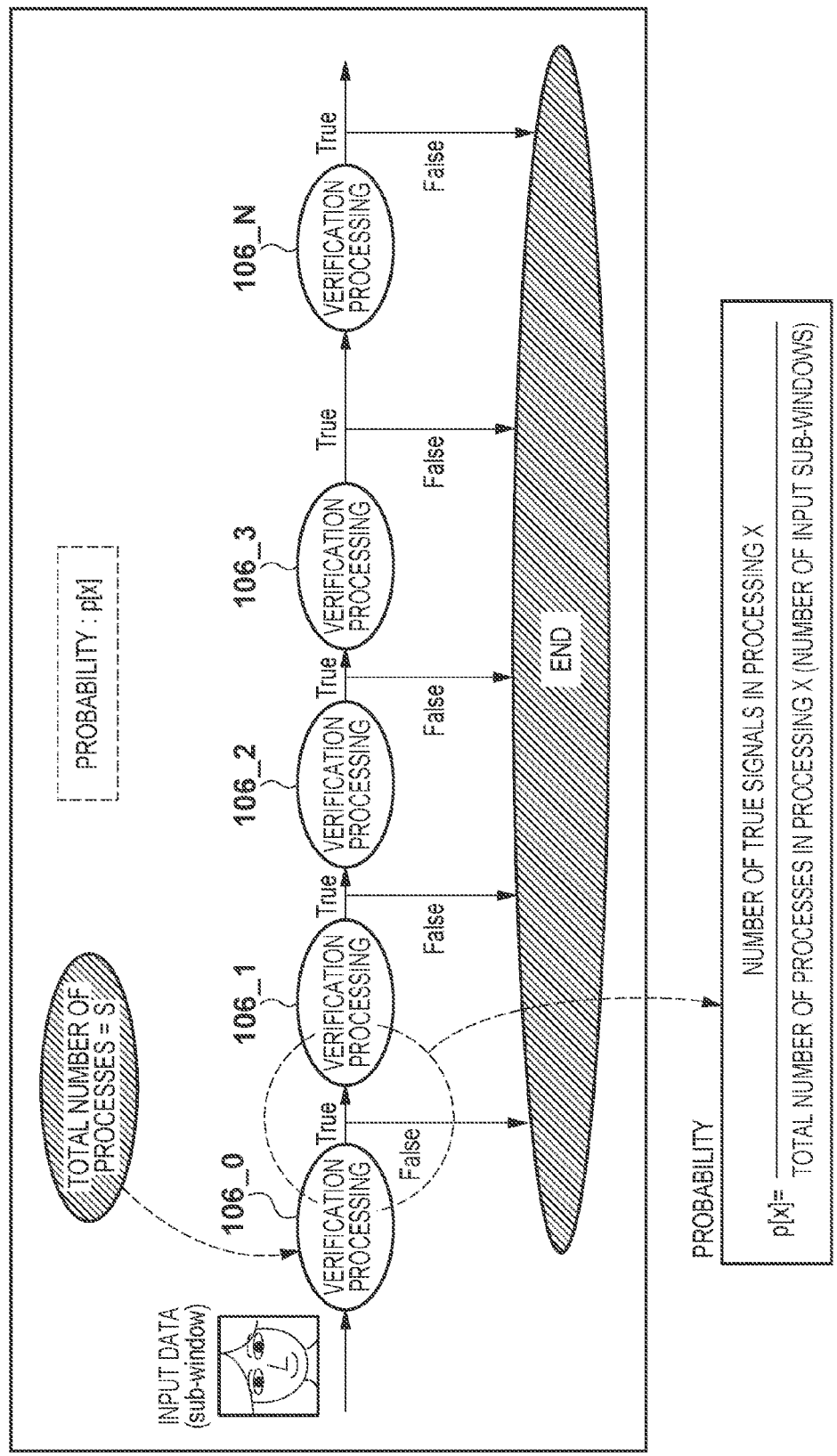
FIG. 5 is a view for explaining face detection processing.

The Viola & Jones method will be schematically described with reference to FIGS. 5 to 8. In the Viola & Jones method, verification processing is executed based on a learning result by AdaBoost. As shown in the procedure of FIG. 5, this verification processing is cascade processing as follows. That is, as a result of certain verification processing, TRUE is output when next verification processing is to be executed and FALSE is output when next verification processing is not to be executed. When FALSE is output, the verification processing ends. For face recognition, as a result of inputting many face data and leaning until a recognition rate or error recognition rate of faces reaches a given level, the number of verification processes and dictionary parameters are output. The verification processing indicates pattern verification processing. The face detection processing, therefore, indicates a group of pattern verification processes using the dictionary parameters. The dictionary parameters include parameters such as feature amounts necessary for the pattern verification processes, and thresholds used as a criterion of TRUE/FALSE determination.

Figure 6:
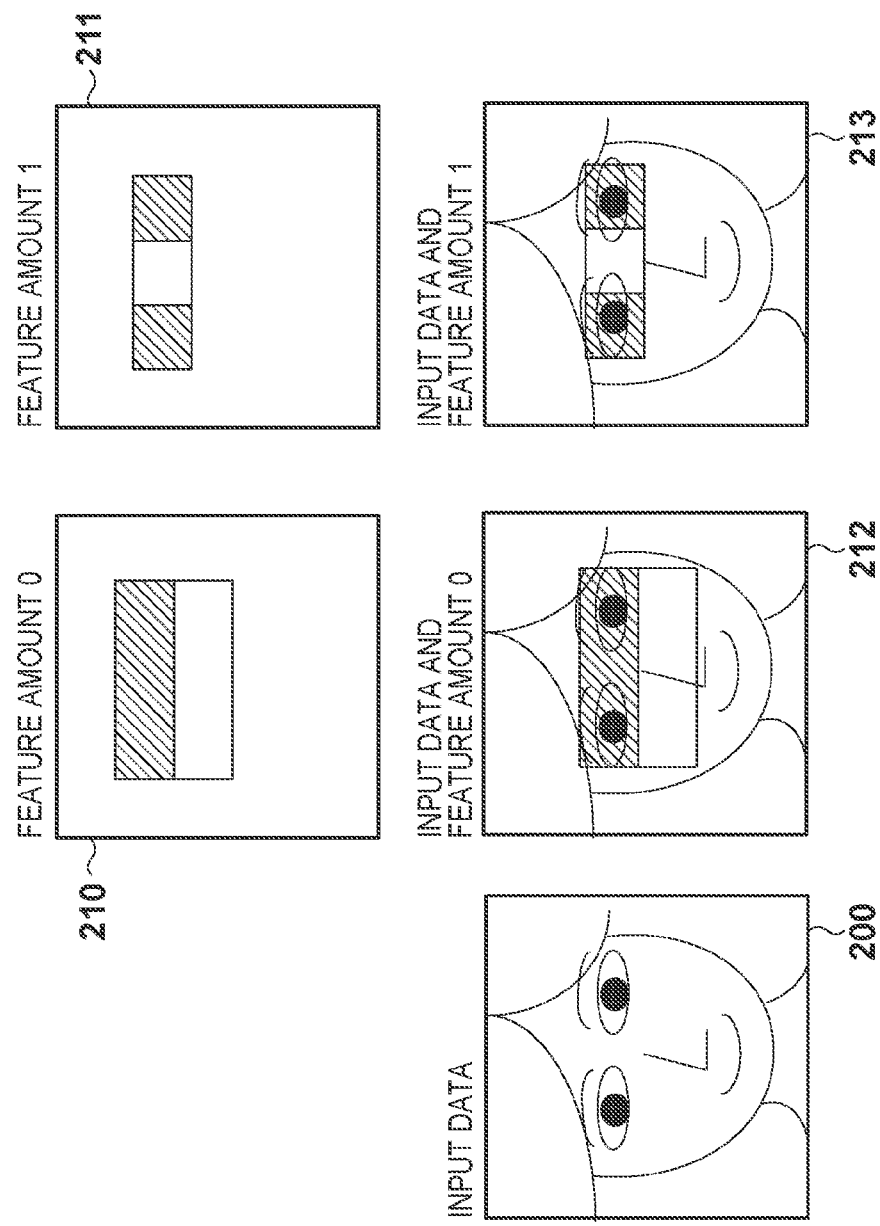
FIG. 6 is a view for explaining the face detection processing.

The dictionary parameters will be referred to as dictionary data hereinafter. FIG. 6 shows an example of the learning result. Feature amount 0, represented by a box 210, of the dictionary data indicates a feature that the luminance of a portion of both eyes has a darker level than that of a portion (a cheek portion) below both the eyes when comparing the small rectangle of the portion of both the eyes with the portion below both the eyes. Feature amount 1 represented by a box 211 indicates a feature that the luminance of an eye portion has a relatively dark level and the luminance of a portion between the eyes has a brighter level than that of the eye portion in the luminance distribution of the portion of both the eyes. Using feature amounts 0 to N of the dictionary data, the pattern verification processes are executed for input data 200. A box 212 is obtained by overlaying feature amount 0 on the input data 200. A box 213 is obtained by overlaying feature amount 1 on the input data 200.

Figure 7:
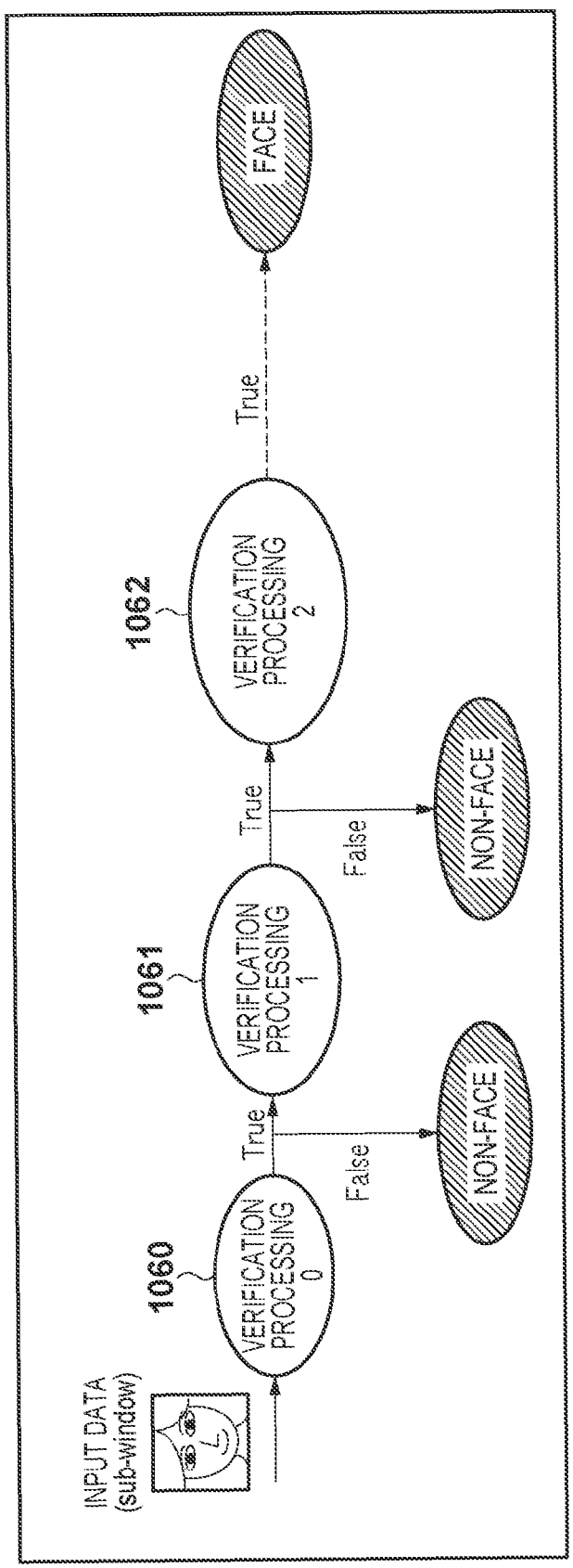
FIG. 7 is a view for explaining the face detection processing.

In the Viola & Jones method, as shown in the procedure of FIG. 7, a face and non-face are determined by making TRUE/FALSE determination for each verification process. In a preceding step, only simple features are used so that a false-negative (determining a face as a non-face: overlooking) rate is minimized and a false-positive (determining a non-face as a face: error detection) rate is relatively high. Since using only simple features enables to execute the verification processing by a small number of calculation operations, high-speed processing becomes possible even when a processor is used to execute the processing. Furthermore, since it is possible to determine many rectangular regions as FALSE (a non-face) at high efficiency in the preceding stage, it is possible to complete the face detection processing for the whole image in a short time. The cascade verification processing for implementing the face detection processing tends to include a larger number of verification patterns towards the last verification process. A processing unit for making TRUE/FALSE determination will be referred to as a step hereinafter. In the prefetch method, corresponding verification processes are sequentially executed in the order of step numbers.

Recognition processing represented by the Viola & Jones method is also applied to recognition of a moving image. Application examples of the recognition processing to a moving image include processing of detecting and focusing on a face using a digital camera, and processing of detecting a face to specify a suspicious individual using a surveillance camera. When the recognition processing is applied to a moving image, it is executed for each frame image forming the moving image. In this case, the processing result of a given frame is probably very similar to that of the immediately preceding frame. That is, it is highly probable that around a region where a face has been detected in processing of a given frame, the face is also detected in processing of the immediately succeeding frame. This is because the moving speed of a recognition target such as a face or human body is considered to be sufficiently low with respect to the frame rate of the moving image. By way of example, FIG. 17A shows the recognition processing result of frame N−1 and FIG. 17B shows the recognition processing result of frame N. Each number in FIGS. 17A and 17B represents the last step number (largest step number) in which the result of processing is TRUE. It is found from FIGS. 17A and 17B that the correlation between the processing results of the frames is high.

A still image (a given frame image) has a feature that the recognition processing results of regions close to each other are similar. In actual recognition processing, a more correct face position is detected by calculating the barycenter of regions adjacent to each other or overlapping each other where a face has been detected, or the like. The example of the processing result of frame N in FIG. 17B represents an example of a processing result in the still image. Referring to the processing result of frame N in FIG. 17B, it is found that in regions close to a region where the result of processing up to step 5 is TRUE, the result of the processing up to step 5 or 4 is TRUE.

Figure 8:
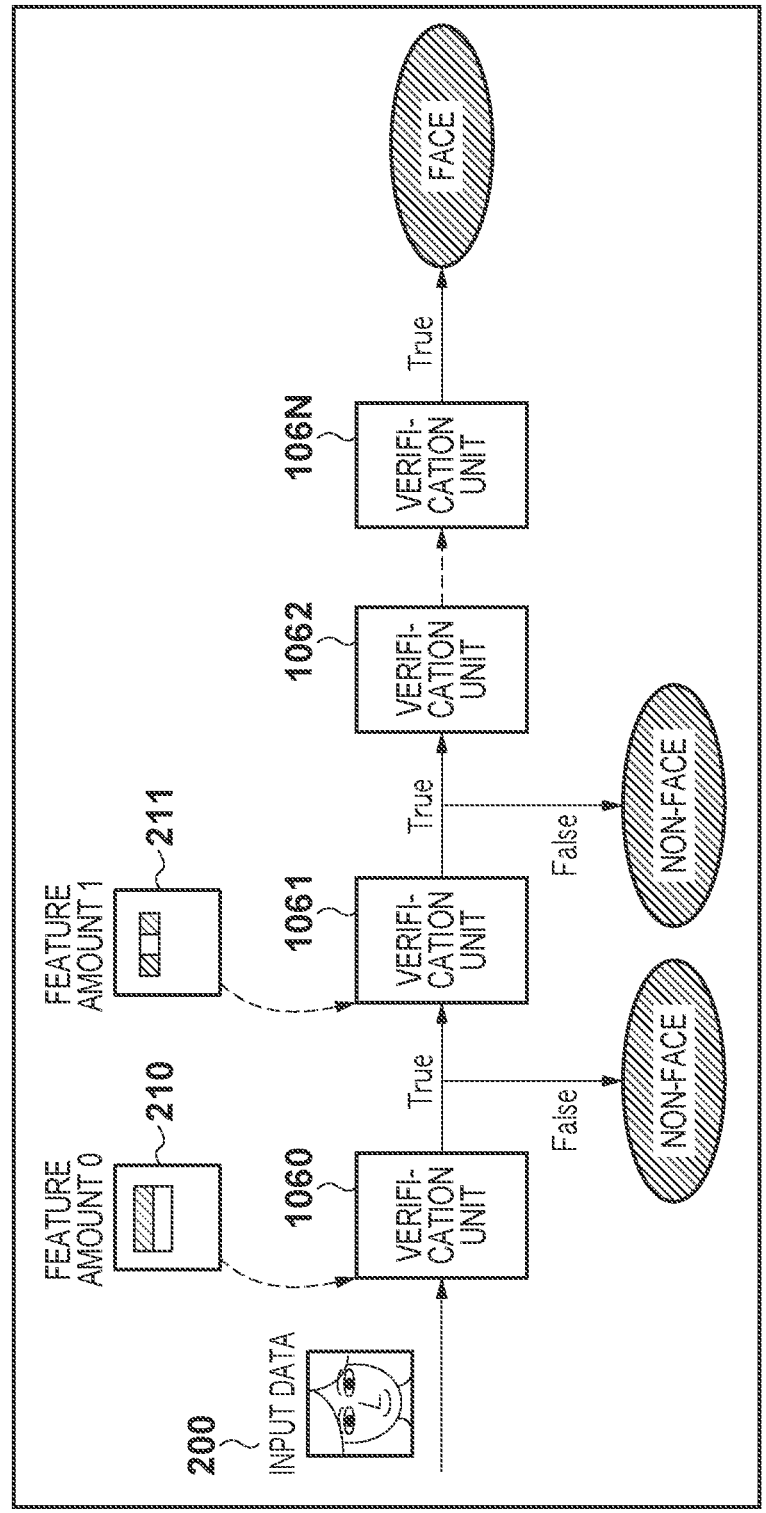
FIG. 8 is a view for explaining the face detection processing.

FIG. 8 is a view showing a schematic configuration when the Viola & Jones method is implemented by hardware. A verification unit 1060 stores feature amount 0 as dictionary data for step 0. The verification unit 1060 also stores threshold 0 described above which is used to determine whether the result of step 0 is TRUE or FALSE. Feature amount 0 and threshold 0 necessary for step 0 will be referred to as dictionary data 0 hereinafter. The processing in step 0 will be referred to as step 0 processing. As described above, when the input data 200 is input to the verification unit 1060, the step 0 processing using dictionary data 0 is executed. The result (TRUE/FALSE) of the processing is input to a verification unit 1061. If the result is TRUE, the verification unit 1061 executes processing for the input data 200 and step 1 processing (pattern verification processing with feature amount 1 and determination using threshold 1), similarly to the verification unit 1060.

Figure 9:
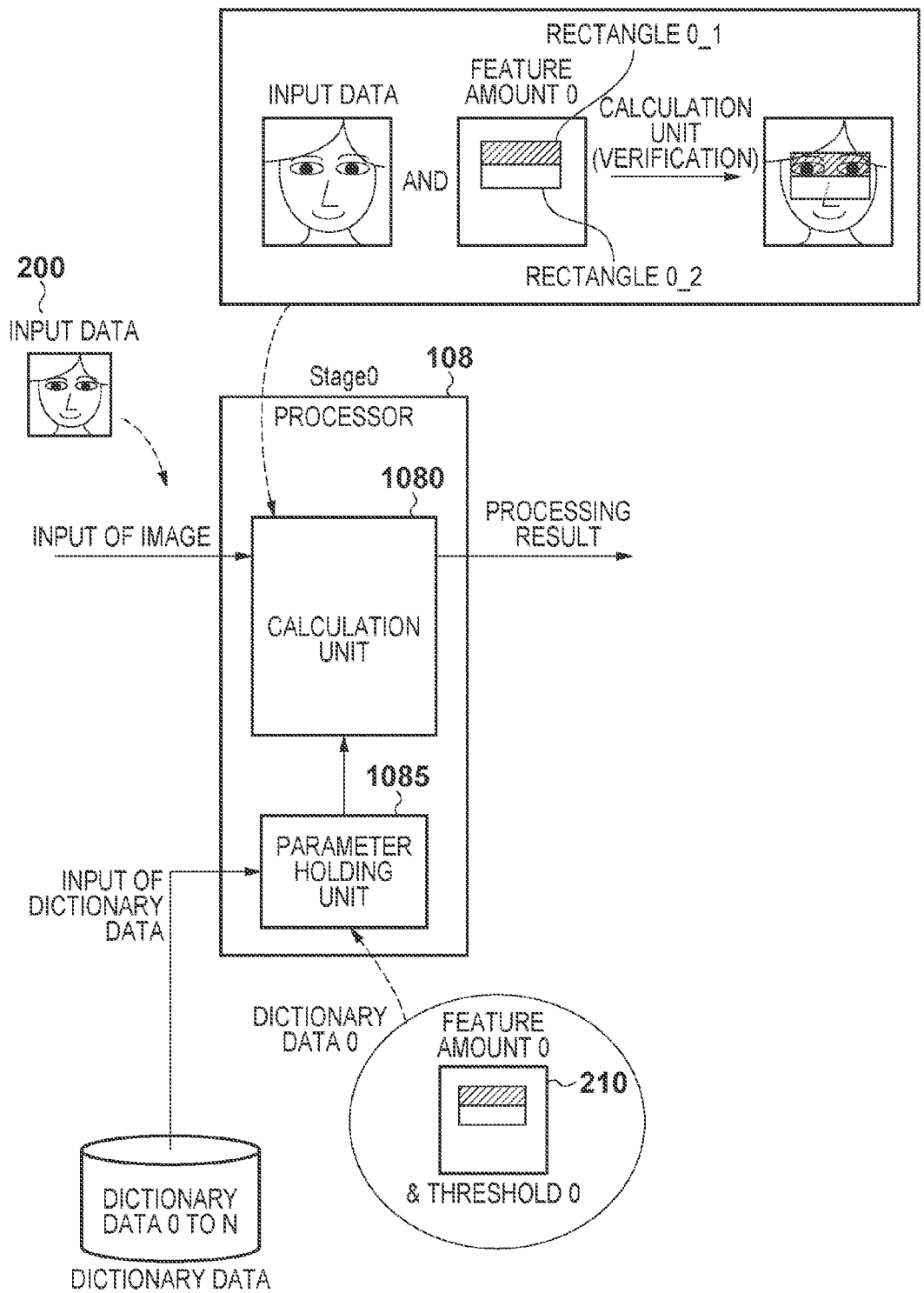
FIG. 9 is a view for explaining the face detection processing.

A block diagram shown in FIG. 9 more practically shows the schematic hardware configuration shown in FIG. 8. A processor 108 includes a calculation unit 1080 and a parameter holding unit 1085. The parameter holding unit 1085 serves as an internal memory for holding dictionary data X necessary for step processing X. For example, for the verification unit 1060 for executing step 0 shown in FIG. 8, the calculation unit 1080 uses feature amount 0 contained in dictionary data 0 held in the parameter holding unit 1085 to execute pattern verification for the input data 200. The step 0 processing calculates the total of input data for rectangle 0_1 as the pattern verification range target of feature amount 0 and input data for rectangle 0_2, thereby calculating the difference between the luminance of rectangle 0_1 And that of rectangle 0_2. If the calculated luminance difference exceeds threshold 0, the input data 200 is considered to match the feature indicated by feature amount 0, thereby outputting the verification processing result (TRUE (a face)).

Feature amount 0 contained in dictionary data 0 indicates pixel positions to be verified. The calculation unit 1080 for executing the pattern verification processing calculates the total of pixel values within the rectangle of the indicated pixel positions. Furthermore, the unit 1080 calculates the difference between the totals of the respective rectangles, and compares it with threshold 0, thereby obtaining a step 0 processing result. That is, the calculation unit 1080 can be implemented to perform similar step-independent calculation according to pixel positions and a threshold specified by dictionary data. The parameter holding unit 1085 holds dictionary data for all steps or steps necessary for processing, and switches between the dictionary data according to a processing step, thereby enabling to execute the verification processes of all the steps.

In recent years, implementation of a function of detecting and focusing on a face by incorporating recognition processing represented by the Viola & Jones method in a digital camera or the like has been demanded, and the need for implementation of recognition processing in real time (at high speed) has increased. On the other hand, since a digital household electrical appliance such as a digital camera is highly cost-sensitive, the need to implement a recognition processing function at as low cost as possible, that is, the need to minimize the circuit scale is very high.

In the block diagram shown in FIG. 9, all the step processes share the calculation unit 1080, thereby suppressing the circuit scale. In this case, a dominant factor of the circuit scale is the number of steps for which the parameter holding unit 1085 holds dictionary data. On the other hand, the processing speed is also very different depending on the number of steps for which the unit 1085 holds dictionary data.

If, for example, very high-speed processing is necessary, there is a method of holding dictionary data for all the steps in the internal memory (the parameter holding unit 1085) which can be accessed at high speed, thereby implementing each step process without replacing dictionary data. This method will be described in detail with reference to a configuration shown in FIG. 10. As described above, the calculation unit 1080 for executing pattern verification processing is step-independent. Therefore, only one calculation unit 1080 is incorporated as in FIG. 9. Parameter holding units 1085 each of which holds step-dependent dictionary data and the number of which is equal to the total number (N) of steps are incorporated. Before starting processing, all dictionary data are loaded into the parameter holding units 1085 (1085_0 to 1085_N). When the input data 200 is input, a parameter switching unit 1081 sets dictionary data 0 (dictionary data for step 0) in the calculation unit 1080, and the step 0 processing starts. If, as a result, TRUE is determined, the parameter switching unit 1081 switches to next dictionary data 1 (dictionary data for step 1) for the input data 200, thereby enabling to execute step 1 processing of the succeeding stage. Holding the dictionary data for all the steps eliminates the need for an overhead for loading data from an external memory, the access speed of which is lower than that of the internal memory, thereby achieving high-speed processing.

Figure 10:
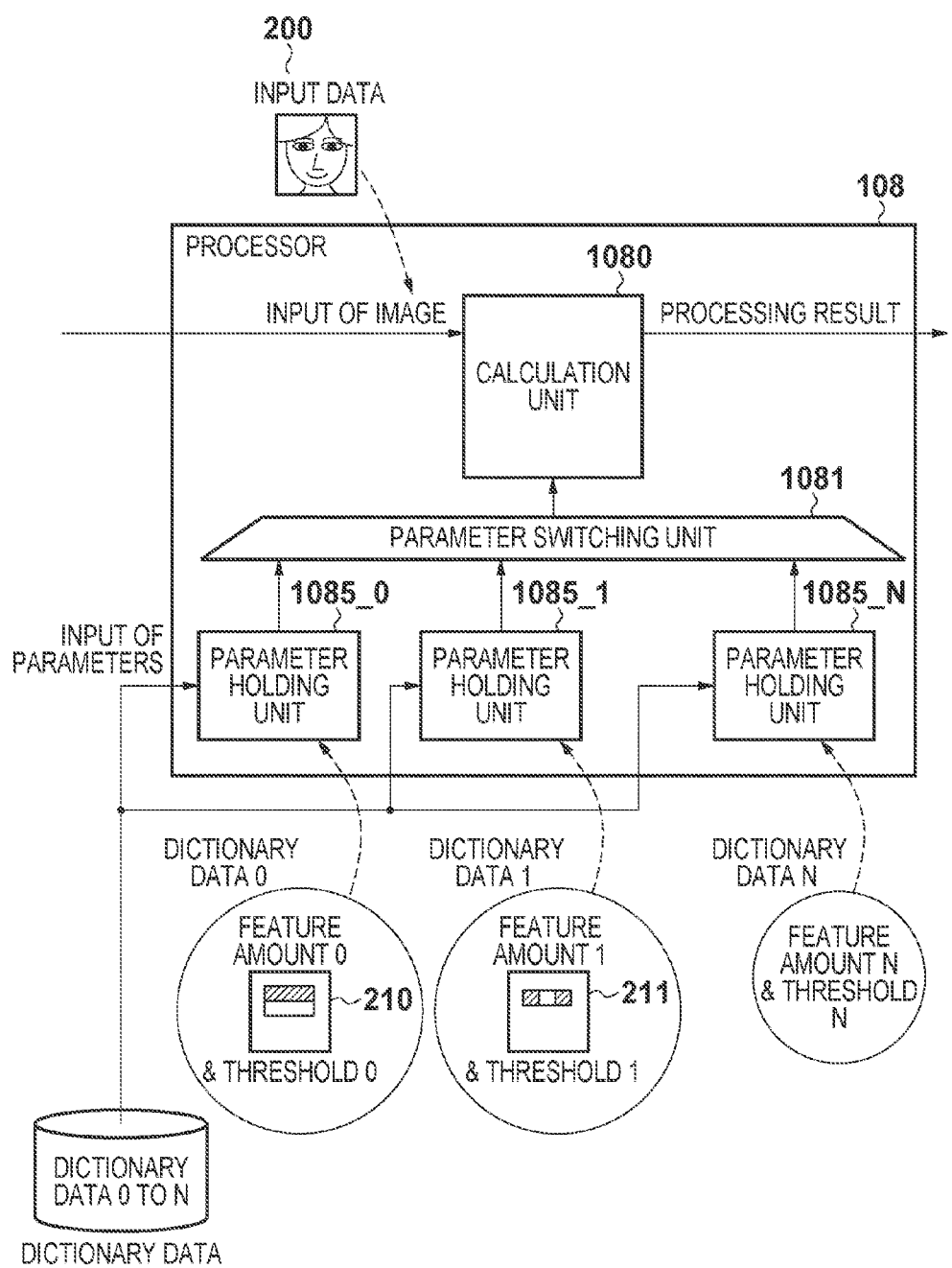
FIG. 10 is a view for explaining a conventional technique in which there exist parameter holding units, the number of which is equal to the total number of verification processes.

In the configuration shown in FIG. 10, while the processing speed is high, it is necessary to incorporate a mass internal memory for holding the dictionary data for all the steps and the cost is thus very high.

Figure 11:
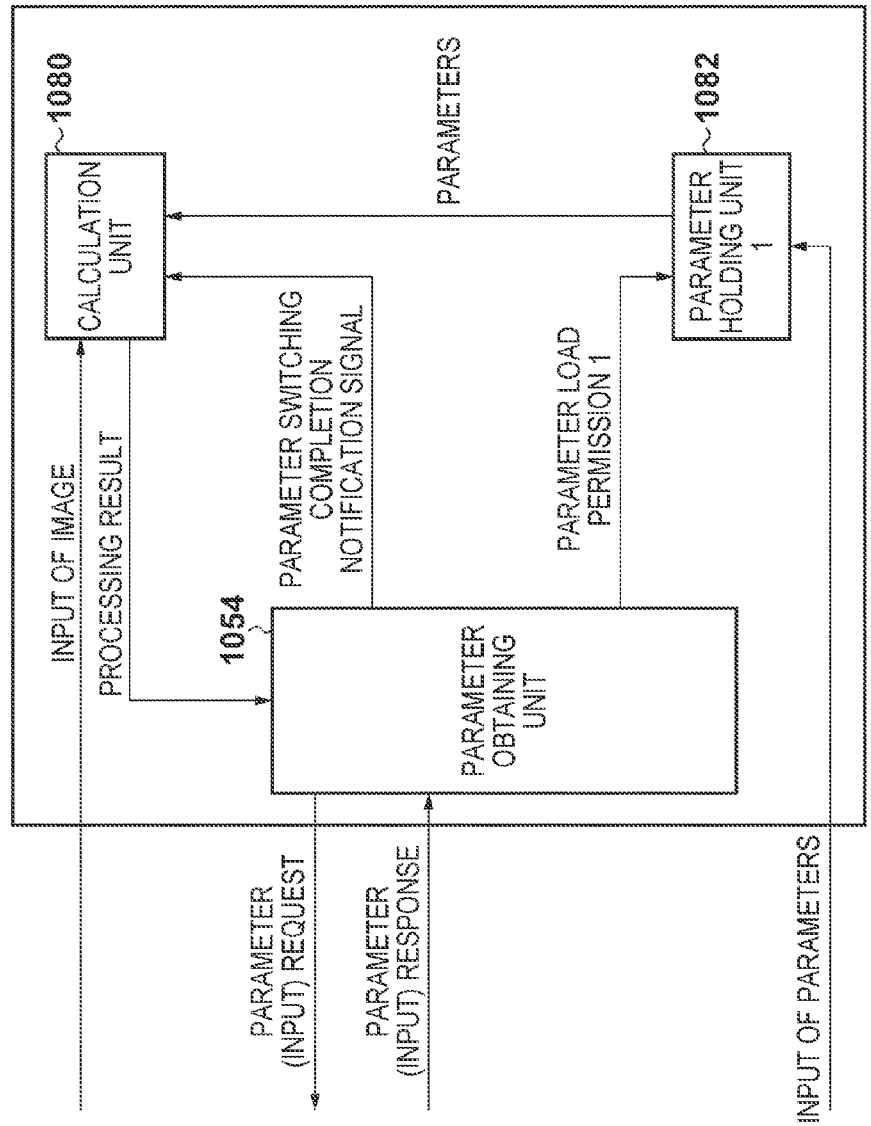
FIG. 11 is a view for explaining the first conventional technique in which there is one parameter holding unit.

Not to make the parameter holding unit 1085 huge, it is a common practice to use a configuration in which one parameter holding unit 1 denoted by reference numeral 1082 is included as shown in FIG. 11, and only dictionary data necessary for each step is loaded from an external memory (to be referred to as Conventional Example 1 hereinafter).

Conventional Example 1 includes a step-independent calculation unit 1080, data-rewritable parameter holding unit 1 for holding step processing-dependent dictionary data, and a parameter obtaining unit 1054. The calculation unit 1080 outputs, as a processing result, a result of executing pattern verification processing using rectangular image data input from an image input signal and the dictionary data held in the parameter holding unit 1082. The parameter obtaining unit 1054 detects the result.

If the processing result is TRUE, it is necessary to execute next step processing for the current rectangular image data and, therefore, the parameter obtaining unit 1054 obtains dictionary data required for the next step processing. Alternatively, if the result is FALSE or step processing of the last stage ends, it is necessary to execute processing for next input data from the step 0 processing of the first stage and, therefore, dictionary data 0 is loaded (obtained) when parameter holding unit 1 does not store dictionary data 0. As described above, if it is necessary to switch the step processes (it is necessary to obtain the dictionary data), a parameter (input) request is sent to obtain the dictionary data from an external memory (not shown). Upon receiving a parameter (input) response to the parameter (input) request, the parameter obtaining unit 1054 sends parameter load permission signal 1 to parameter holding unit 1. In response to this permission signal, a parameter input operation to parameter holding unit 1 starts and the obtained dictionary data is loaded. After the parameter input operation to parameter holding unit 1 ends, the parameter obtaining unit 1054 notifies the calculation unit

1080 of a parameter switching completion notification signal, thereby enabling the calculation unit 1080 to execute the next step processing.

As described above, the parameter obtaining unit 1054 detects the processing result of the calculation unit 1080, and obtains, as needed, dictionary data necessary for a next operation. The obtained dictionary data enables to sequentially execute step processes for input rectangular image data by controlling to send an instruction to the calculation unit 1080 after loading parameters into parameter holding unit 1 to rewrite parameters.

Figure 12:
FIG. 12 is a view for explaining a recognition processing example.

A processing procedure executed for rectangular image data which are extracted in a given line direction from a given input image as shown in FIG. 12 will be described. The rectangular image data will be referred to as rectangular image data A1, A2, . . . . Assume that A1(S1) represents execution of step 1 processing for rectangular image data A1, and S1 indicates a load of dictionary data 1 necessary for the step 1 processing.

The horizontal direction in FIG. 12 represents a line direction, and the vertical direction represents the depth of processing. That is, since a result of executing the processing in step 1 for rectangular image data A1 at the leftmost position in the given line direction is FALSE, the processing in step 1 is executed for next rectangular image data A2. Then, since the result of the processing is TRUE, processing in step 2 is executed for image data A2.

Terms necessary for description of a processing time will be defined first. A step processing time indicates a time taken to execute each step process. A parameter load time indicates a time required to load dictionary data stored in an external memory into the parameter holding unit.

A case in which the parameter load times of load operations S1, S2, and S3 gradually increase by one, two, and four times will be described below. This is because, as described with reference to FIG. 7, it is assumed that the number of verification processes increases towards the last stage. In this example, all the step processing times are equal to each other. This is because it is possible to create hardware to be capable of executing a plurality of verification processes in parallel. Assume also that the step processing time is equal to the parameter load time of load operation S1.

A processing time when the recognition processing described with reference to FIG. 12 is implemented by the configuration shown in FIG. 11 will be described with reference to FIG. 13.

A way of expression in FIG. 13 will be described first. (FIGS. 15, 17A, 17B, and 2 (to be described later) also show processing times in the same way of expression.)

Figure 13:
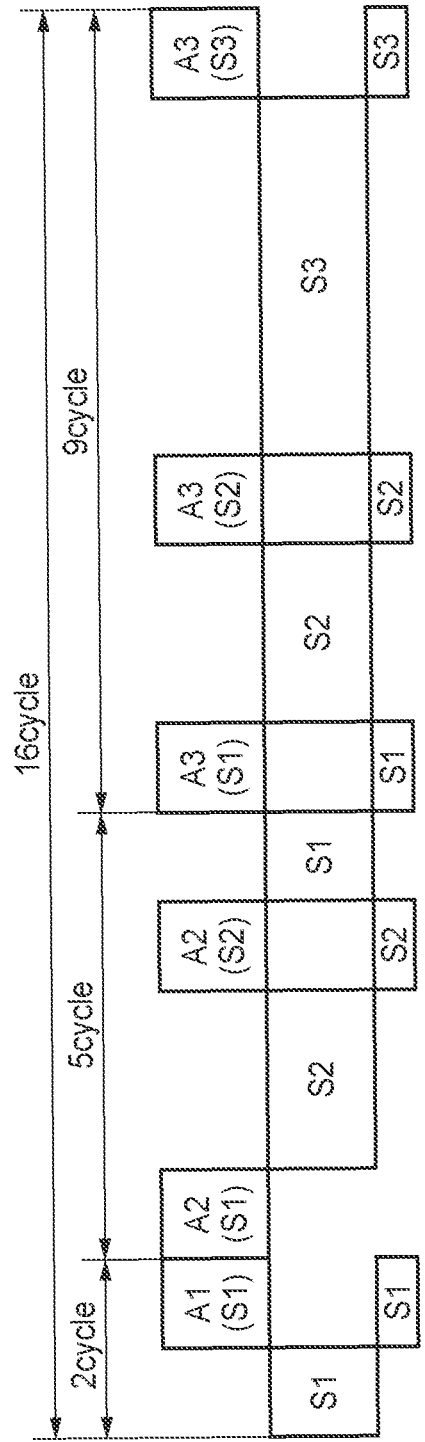
FIG. 13 is a view for explaining a processing time according to Conventional Example 1.

The first row (top row) of FIG. 13 indicates a time (processing cycle) during which the calculation unit 1080 in FIG. 11 executes processing. A1(S1) represents a cycle in which step 1 is processed for rectangular image data A1.

The second row indicates dictionary data load cycles. In FIG. 11, the parameter obtaining unit 1054 sends a parameter (input) request, and obtains dictionary data from an external memory (not shown). The second row indicates a time during which the obtained dictionary data is loaded, and S1 represents a dictionary data load cycle in which dictionary data S1 is loaded. The third row indicates dictionary data held in parameter holding unit 1 of FIG. 11. The number of parameter holding units 1 is also shown. FIG. 13 is a view showing a processing time when there is one parameter holding unit 1, and therefore, one memory is shown in the third row. In a case (to be described later) in which there are two parameter holding units, two memories are shown in the third row.

Since step processing always starts in step 1, load operation S1 for dictionary data for step 1 is executed first in Conventional Example 1 (FIG. 11). When rectangular image data A1 is input, processing "A1(S1)" starts. Since its processing result is FALSE, next input data is processed. As parameter holding unit 1 already stores dictionary data 1 for step 1 at this time, processing "A2(S1)" is directly executed. Since the result of processing A2(S1) is TRUE, processing A2(S2) is executed after load operation "S2" for dictionary data 2 for step 2 ends. Because the result of processing A2(S2) is FALSE, processing A3(S1) is executed after dictionary data S1 necessary for a next operation is loaded. As described above, in Conventional Example 1, there is one parameter holding unit 1, so it is necessary to load dictionary data every time step processing is switched. Therefore, the step processing stops while dictionary data is loaded. That is, as compared with a case shown in FIG. 10 in which dictionary data 0 to N (1085_0 to 1085_N) for all the step processes are held, a delay occurs by a time during which the step processing stops (that is, a time during which dictionary data is loaded). Assume that a step processing time is expressed in units of cycles. In this case, in Conventional Example 1 of FIG. 13, it takes 16 cycles to complete processing A3(S3), and 10 cycles are required to load dictionary data in addition to a processing time of six cycles. In the configuration of FIG. 11, since dictionary data is loaded for each switching operation, a processing time and a dictionary load time are mutually exclusive. That is, while dictionary data is loaded, the processing always stops.

As described above, in the configuration in which the internal memory holds the dictionary data for all the steps, the processing speed is highest but the circuit scale is largest. On the other hand, in the configuration of Conventional Example 1 in which the internal memory holds dictionary data for one step and dictionary data necessary for each step process is loaded from the external memory, the circuit scale is smallest but the processing speed significantly drops.

To deal with such problems, a cache method or prefetch method (a method of preparing in advance parameters necessary for a next operation) is widely used as a conventional technique for increasing the processing speed while suppressing the circuit scale of the internal memory.

The cache method and prefetch method will be described in detail below. The cache method will be referred to as Conventional Example 2 and the prefetch method will be referred to as Conventional Example 3 hereinafter.

Figure 14:
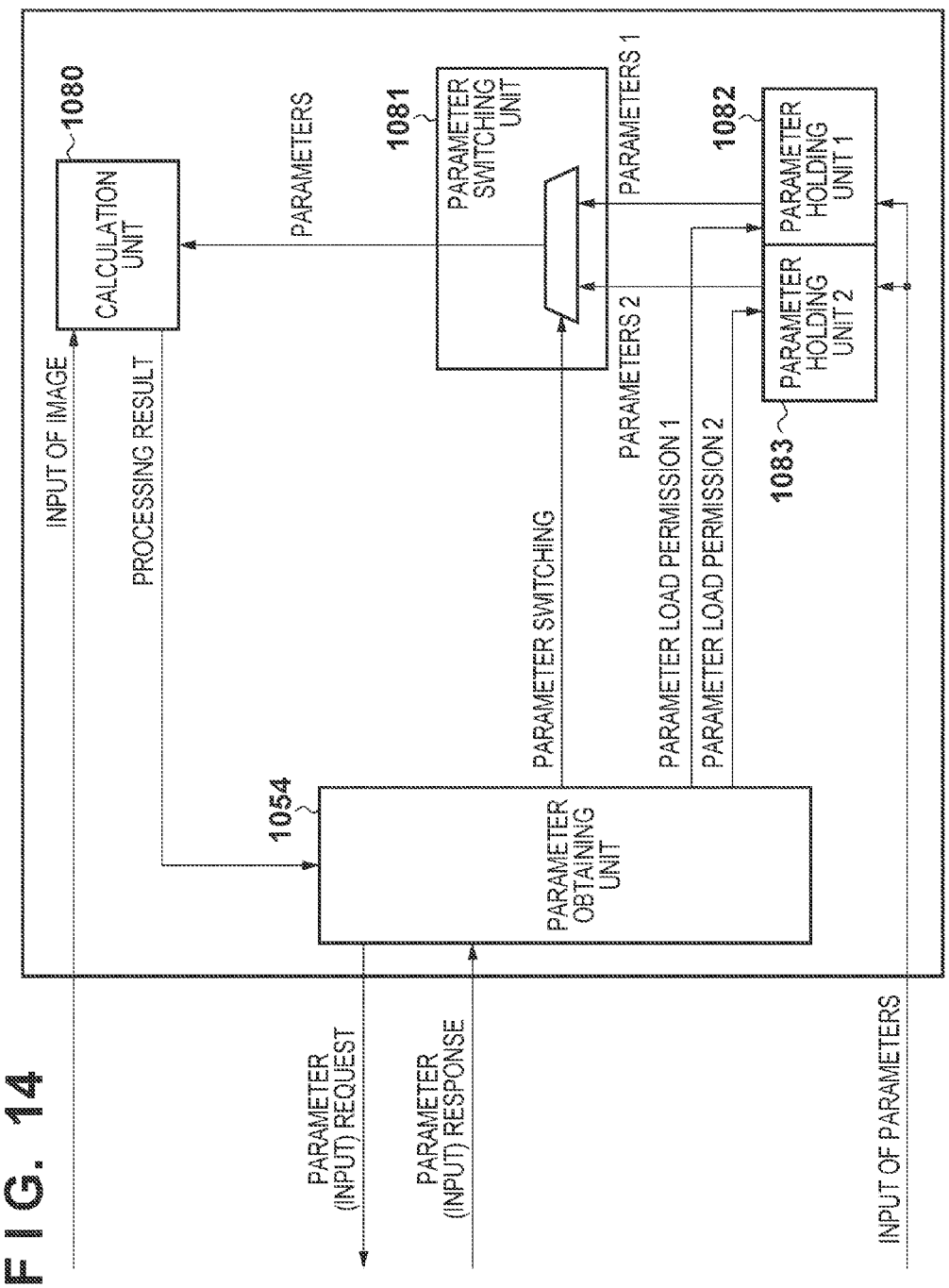
FIG. 14 is a view for explaining the second and third conventional techniques in which there are two parameter holding units.

FIG. 14 shows a configuration (common to Conventional Examples 2 and 3) which is obtained by adding parameter holding unit 2 denoted by reference numeral 1083 and the parameter switching unit 1081 to the configuration of FIG. 11, and which implements the cache method of Conventional Example 2 and the prefetch method of Conventional Example 3. Since there are a plurality of parameter holding units, it is possible to hold a plurality of obtained dictionary data.

The processing procedure of the cache method of Conventional Example 2 in the configuration of FIG. 14 will be described. The cache method of deleting the oldest dictionary data to free an area for holding new dictionary data will be especially explained.

As described above, the calculation unit 1080 sequentially executes step processes for transferred rectangular image data. The parameter obtaining unit 1054 detects a step processing result from the calculation unit 1080. Based on the detected result, a step to be processed next is determined. It is thus detected whether parameter holding unit 1 or 2 stores dictionary data necessary for the next step processing. If the necessary dictionary data is stored, the parameter obtaining unit 1054 sends a switching instruction to the parameter switching unit 1081, thereby enabling the calculation unit 1080 to execute processing using parameters necessary for the next step.

If the parameter obtaining unit 1054 detects the step processing result from the calculation unit 1080, and determines that it is necessary to obtain dictionary data, it sends a parameter input request to obtain the dictionary data. The dictionary data is obtained by receiving a parameter input response, and then sending a parameter load permission signal to the parameter holding unit which holds the oldest dictionary data. As a result, one of parameter holding units 1 and 2, which holds the oldest dictionary data, undergoes a data write operation. Upon detecting end of the parameter write operation, the unit 1054 sends a parameter switching instruction to the parameter switching unit 1081.

As described above, the parameter obtaining unit 1054 detects a result from the calculation unit 1080, and obtains, as needed, dictionary data necessary for a next operation. After the unit 1054 loads parameters into parameter holding unit 1 or 2, it sends an instruction to the parameter switching unit 1081. Such control allows to sequentially execute step processes for transferred rectangular image data.

Different parts of the processing of the prefetch method of Conventional Example 3 in the configuration of FIG. 14 as compared with the above-described cache method of Conventional Example 2 will be described.

In the prefetch method, when the calculation unit 1080 executes step processing S, a parameter obtaining operation in next step S+1 is simultaneously performed for the other parameter holding unit which the calculation unit 1080 does not refer to, without waiting for the calculation result of step processing S.

The parameter obtaining unit 1054 sends a switching instruction to the parameter switching unit 1081 so that the calculation unit 1080 can execute step S processing using the parameter holding unit which holds parameters for step S. Along with the switching instruction, the unit 1054 sends a parameter (input) request for next step S+1 to perform the prefetch operation of step S+1. Upon receiving a parameter (input) response, the parameter obtaining unit 1054 sends a parameter load permission signal to the parameter holding unit which is not used for the step S processing, and permits to write parameters. The parameter input indicates a load (write) of dictionary data into the parameter holding unit which has write permission.

Figure 15:
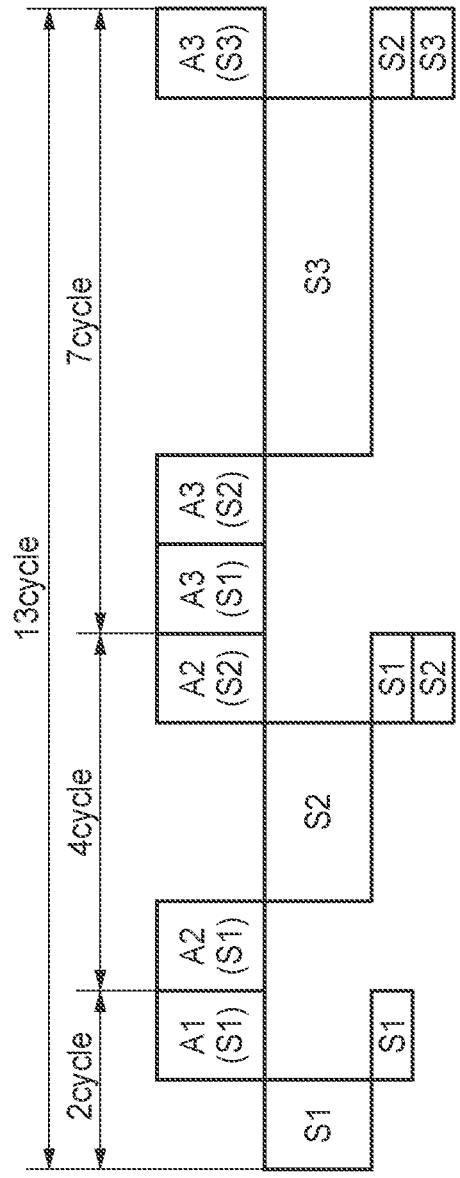
FIG. 15 is a view for explaining a processing time according to Conventional Example 2 (a cache method)

A processing time when the cache method of Conventional Example 2 or the prefetch method of Conventional Example 3 is used will be described with reference to FIGS. 15, 17A, and 17B.

A processing time when the cache method of Conventional Example 2 is used in the configuration of FIG. 14 will be explained first with reference to FIG. 15.

Up to step 1, there is no loss at all in the cache method. As shown in FIG. 15, however, if the result of processing A2(S1) is TRUE, load operation S2 (a load of dictionary data for step 2) is necessary to execute next processing A2(S2), and the processing stops until the load operation ends. As described above, in the cache method, although there is no loss while the same step is executed, it is always necessary to wait a dictionary load time to process a step which is not in a cache. Since, however, there are two parameter holding units, it is possible to obtain cache effects while steps 1 and 2 are successively processed.

In this example, it takes 13 cycles to execute processing A3(S3). It is found when compared with the example of FIG. 13 that the processing time is shortened by two cycles until processing A3(S2) up to which operations S1 and S2 are successively performed is executed.

A processing time when the prefetch method of Conventional Example 3 is used in the configuration of FIG. 14 will be described with reference to FIG. 16. Note that a prefetch method is exemplified assuming that step S processing currently processed is followed by step S+1 processing.

Similarly to the cache method of Conventional Example 2, a case in which parameter holding units 1 and 2 are included in FIG. 14 will be described.

Figure 16:
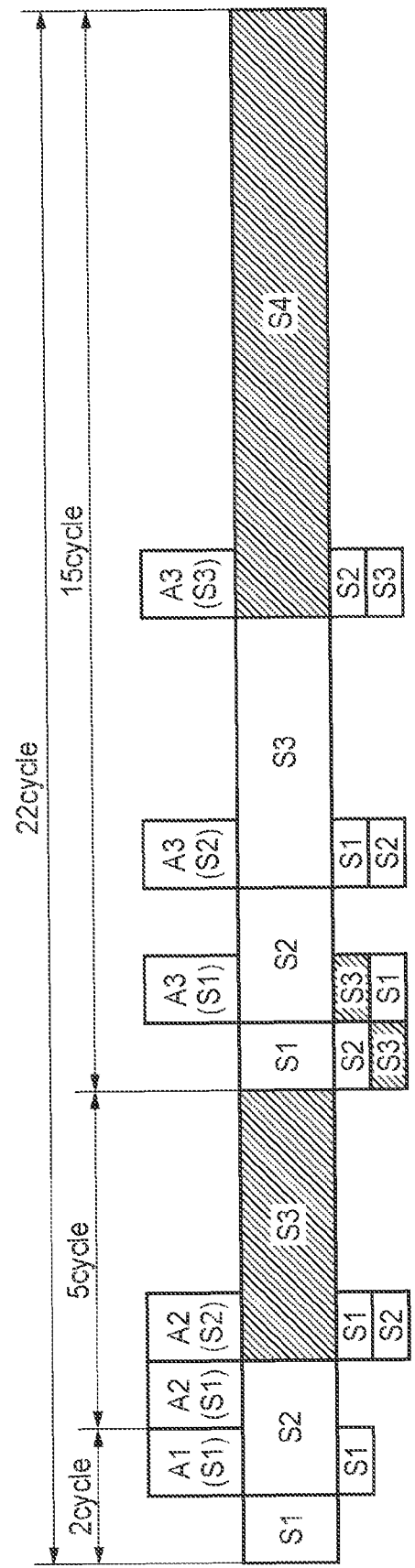
FIG. 16 is a view for explaining a processing time according to Conventional Example 3 (a prefetch method)

Referring to FIG. 16, simultaneously with start of processing A1(S1), prefetching data S2 into parameter holding unit 2 other than parameter holding unit 1 which holds data S1 starts. Since the result of processing A1(S1) is FALSE but parameter holding unit 1 holds data S1, processing A2(S1) immediately starts. The result of processing A2(S1) is TRUE and next processing A2(S2) starts. Since the prefetch operation started simultaneously with processing A1(S1), data S2 has already been loaded into parameter holding unit 2, and therefore, it is possible to immediately start the processing. Simultaneously with start of processing A2(S2), data S3 is prefetched into parameter holding unit 1. This prefetch operation erases data S1 which is the oldest data at this time. If the result of processing A2(S2) is FALSE, it is necessary to load data S1 required for parameter verification processing of the first stage for next input data A3. This means that data S2 which is the oldest data at this time is deleted, and data S1 is loaded. When data S1 can be loaded, data S3 is loaded into other parameter holding unit 2. Simultaneously with start of processing A3(S1), prefetching data S2 which is predicted to be required for succeeding processing starts. In this way, a prefetch operation is performed as needed, and it takes 22 cycles to complete processing A3(S3). That is, if it is impossible to forcibly stop a prefetch operation, the processing stops while parameters which are no longer necessary for a next operation are loaded. Even if processing A2(S2) is processed and its result is FALSE, the processing stops to wait for completion of the load operation of data S3 which is not necessary for a next operation. Furthermore, since the parameter dictionary data necessary for the next operation is overwritten, it is necessary to reload the dictionary. In this example, data S3 is loaded without waiting for the result of processing A2(S2), thereby overwriting data S1 which is the oldest data at this time. It is, therefore, necessary to reload dictionary data S1 necessary for next processing A3(S1). That is, when a result of predicting parameters necessary for a next operation is wrong, a penalty for a parameter load error is imposed.

That is, in the recognition processing, an effective prefetch operation can be executed only while the result of processing is TRUE. As in a case in which the result of processing A2(S2) is FALSE, dictionary data S3 for step 3 which is currently loaded is no longer necessary once (for next processing) the result of processing A2(S2) becomes FALSE. Since data S1 is erased by loading dictionary data S3, the processing stops while data S1 necessary for next processing is reloaded.

That is, in the prefetch method, as the number of step processing results of FALSE is larger, the number of needless dictionary data load operations and the number of reload operations for dictionary data overwritten by loading needless dictionary data increase.

Figure 1:
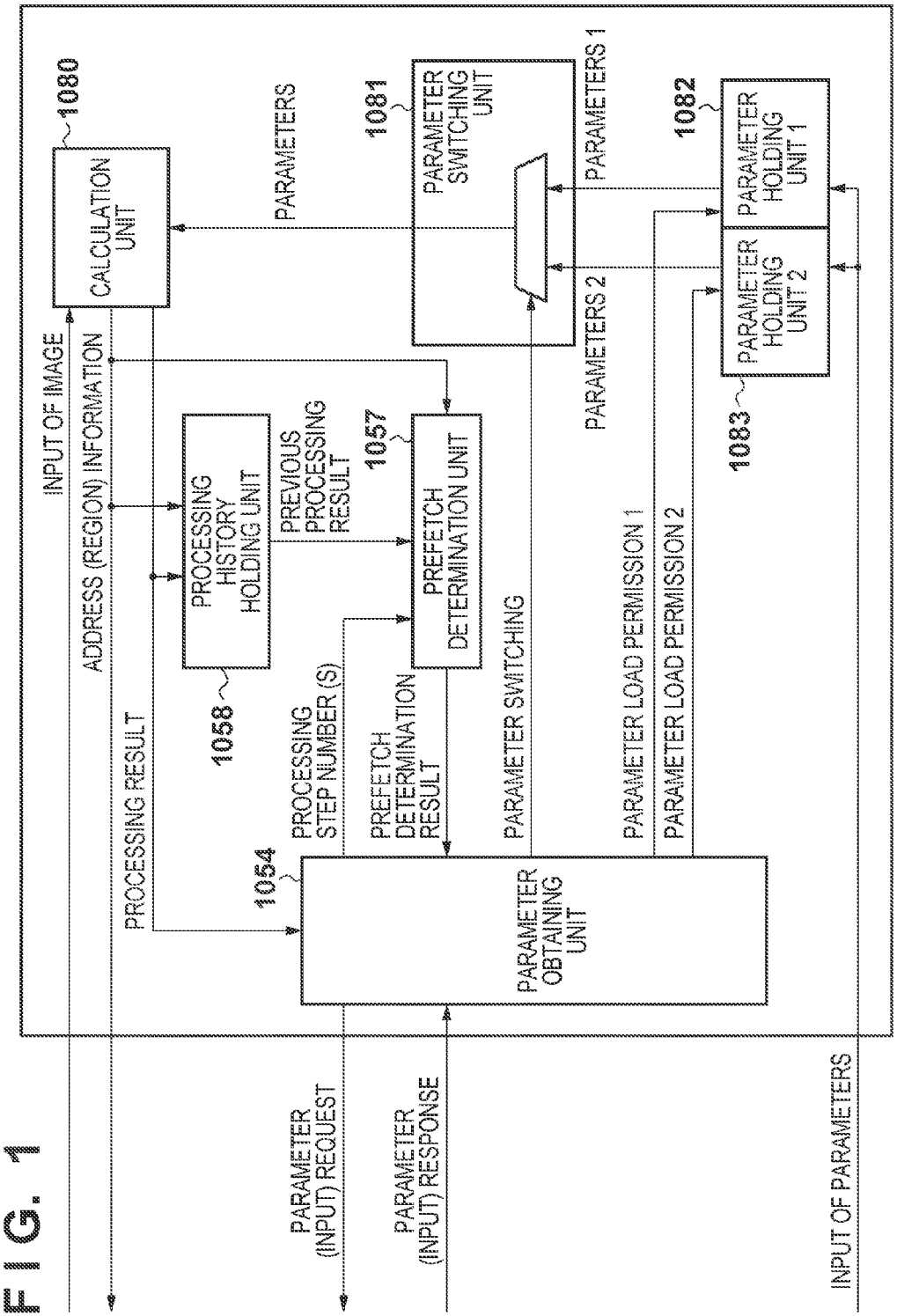
FIG. 1 is a view showing the schematic configuration of a data processing apparatus according to the present invention.

With regard to these points, a data processing apparatus according to the first embodiment of the present invention will be described with reference to FIG. 1. The data processing apparatus according to the first embodiment recognizes a target object by referring to dictionary data for each of a plurality of input data, and sequentially executing one or a plurality of verification processes for each predetermined region of the input data. The configuration of the data processing apparatus shown in FIG. 1 is obtained by adding a processing history holding unit 1058 and a prefetch determination unit 1057 to the configuration of the conventional data processing apparatus shown in FIG. 14. That is, the data processing apparatus includes the calculation unit 1080, the parameter switching unit 1081, parameter holding unit 1 (1082), parameter holding unit 2 (1083), the parameter obtaining unit 1054, the prefetch determination unit 1057, and the processing history holding unit 1058.

The calculation unit 1080 receives the rectangular image data of a frame currently processed, and dictionary data necessary for a step currently processed, executes verification processing, and outputs a processing result.

The processing history holding unit 1058 holds the processing result output from the calculation unit 1080.

The parameter obtaining unit 1054 receives the processing result output from the calculation unit 1080, and detects dictionary data necessary for a next operation. If the necessary dictionary data is not held in either parameter holding unit 1 or 2, it is loaded. To execute the load processing, the parameter obtaining unit 1054 outputs a parameter input request. Upon receiving a parameter input response to the parameter input request, the unit 1054 outputs a parameter load permission signal to one of the parameter holding units. Upon receiving the parameter load permission signal, the parameter holding unit loads input parameters. If the load operation of the necessary dictionary data is complete, or the necessary dictionary data is already held in parameter holding unit 1 or 2, the parameter obtaining unit 1054 sends a parameter switching instruction to the parameter switching unit 1081.

The parameter switching instruction is used to switch between the parameter holding units so that the calculation unit 1080 can perform calculation using a necessary parameter holding unit, and is sent by, for example, a select signal. Once parameter switching is complete, the calculation unit 1080 starts processing. Simultaneously with instruction of start of the processing, the parameter obtaining unit 1054 inputs a current processing step number (S) to the prefetch determination unit 1057. The prefetch determination unit 1057 determines based on the current processing step (S) whether to prefetch dictionary data necessary for a next step (S+1), and returns the determination result to the parameter obtaining unit 1054. The determination processing is executed by receiving address information indicating a region currently processed from the calculation unit 1080, and referring to the processing result of the preceding frame held in the processing history holding unit 1058.

Upon receiving a determination result indicating that a prefetch operation is to be executed, the parameter obtaining unit 1054 sends a parameter input request for a next step to request to load parameters necessary for the next step. Upon receiving a parameter input response to the parameter input request, the unit 1054 outputs a parameter load permission signal to the other parameter holding unit which is not used in current step processing S, and loads input parameters into the parameter holding unit.

If the unit 1054 receives the processing result from the calculation unit 1080, and the result is TRUE, step processing in next step S+1 is executed. If, at this time, the parameter holding unit already holds parameters for next step S+1 by the above-described prefetch method, it is possible to execute next step processing S+1 only by sending a switching instruction to the parameter switching unit 1081.

The processing history holding unit 1058 will now be described in detail.

The processing history holding unit 1058 holds the processing result output from the calculation unit 1080. The processing result includes the address information of a predetermined region undergone the processing, and the last step number in which the result of the processing of the region is TRUE. The address information of the region contains information for identifying a frame, and information for identifying rectangular image data within the frame. For example, a frame number can be used as the information for identifying a frame. The address of the upper right pixel of rectangular image data within the frame can be used as the information for identifying the rectangular image data. The step number held in the processing history holding unit 1058 will be described next. If a processing result in a given region is FALSE in step S, processing results up to step S−1 are considered to be TRUE. A step number S−1 is therefore held in the processing history holding unit 1058. If the result of processing in step 3 is FALSE, a step number 2 is held in the processing history holding unit 1058. If the result of processing in step 1 is FALSE, a step number 0 is held in the processing history holding unit 1058. If the result of processing in the last step is TRUE, a last step number SMAX is held in the processing history holding unit 1058.

The prefetch determination unit 1057 will now be described in detail.

The prefetch determination unit 1057 receives address information indicating a predetermined region currently processed from the calculation unit 1080. Based on the received address information, the unit 1057 refers to the processing result of the preceding frame of rectangular image data currently processed, which is held in the processing history holding unit 1058, and obtains the last step number (largest step number) in which the result of the processing of the preceding frame is TRUE. Furthermore, the prefetch determination unit 1057 receives a step number S currently processed from the parameter obtaining unit 1054, and compares a next step number S+1 with the step number obtained from the processing history holding unit 1058. If, as a result of the comparison, the next step number S+1 is equal to or smaller than the largest step number obtained from the processing history holding unit 1058, it is determined to execute a prefetch operation. The determination result is output to the parameter obtaining unit 1054.

As described above, in the recognition processing using a moving image, the processing result of the preceding frame is very similar to that of the frame currently processed. That is, the processing result of the frame currently processed is probably TRUE up to a step in which the processing result of the preceding frame is TRUE. It is, therefore, possible to eliminate needless prefetch operations by prefetching dictionary data for steps in which the processing result of the preceding frame is TRUE.

Figure 2:
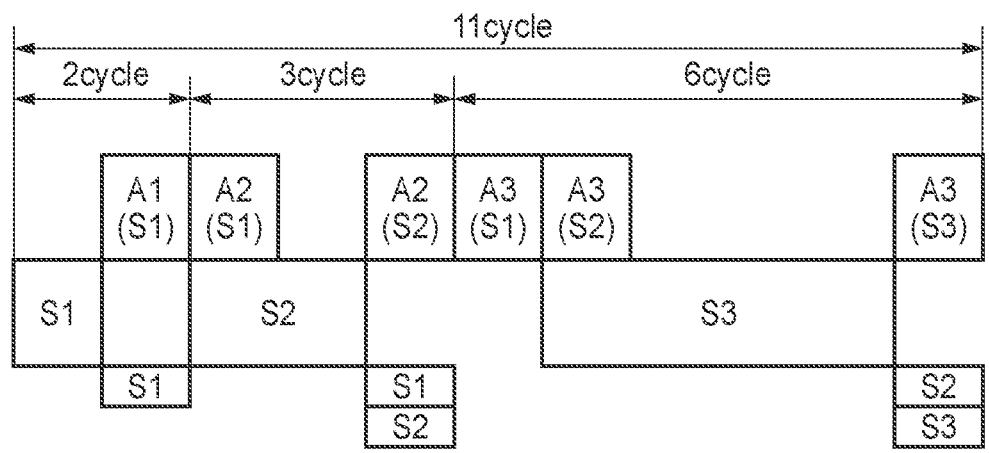
FIG. 2 is a view for explaining a processing time according to the present invention.

A processing time in the present invention (FIG. 1) will be described with reference to FIG. 2 under the same conditions as those of FIG. 12 described above. Note that FIG. 18 shows the processing result of the preceding frame necessary for the present invention.

Similarly to the conventional examples, data S1 is loaded first in this embodiment. Along with processing A1(S1) executed by the calculation unit 1080, the prefetch determination unit 1057 determines a step until which a prefetch operation is executed for rectangular image data A1 currently processed. The prefetch determination unit 1057 refers to the processing result of the preceding frame of rectangular image data A1 in the processing history holding unit 1058. Since the processing result of the preceding frame is TRUE up to step S1, the unit 1057 determines to prefetch dictionary data for up to step S1 for rectangular image data A1 currently processed. Furthermore, the prefetch determination unit 1057 receives the step number S1 currently processed from the parameter obtaining unit 1054, and determines whether to prefetch dictionary data for next step S2. Since next step S2 indicates a step succeeding to step S1 for which it has been determined to execute a prefetch operation, it is determined not to prefetch parameters for step S2. That is, the step number 2 is not equal to or smaller than the step number 1 obtained from the processing history holding unit 1058, so it is determined not to execute a prefetch operation. The determination result is returned to the parameter obtaining unit 1054. In response to the determination result, the parameter obtaining unit 1054 does not prefetch parameters.

Since the result of processing A1(S1) is FALSE, the calculation unit 1080 executes next processing A2(S1). The prefetch determination unit 1057 determines a step until which a prefetch operation is executed for rectangular image data A2, similarly to rectangular image data A1. As the processing result of the preceding frame is TRUE up to step S2 for rectangular image data A2, it is determined to execute a prefetch operation up to step S2. Furthermore, the prefetch determination unit 1057 receives the step number S1 currently processed from the parameter obtaining unit 1054, and determines whether to prefetch dictionary data for next step S2. Since next step S2 indicates the same step as step S2 for which it has been determined to execute a prefetch operation, it is determined to prefetch the parameters for step S2. That is, since the next step number 2 is equal to or smaller than the step number 2 obtained from the processing history holding unit 1058, it is determined to execute a prefetch operation. The determination result is returned to the parameter obtaining unit 1054. In response to the determination result, the parameter obtaining unit 1054 prefetches the parameters for step S2. Since the result of processing A2(S1) is TRUE but the dictionary data for step S2 is being prefetched at this time, the processing waits for completion of the prefetch operation for the dictionary data for step S2. Upon completion of the prefetch operation for the dictionary data for step S2, parameters are switched and processing A2(S2) is then executed. Since the prefetch determination result is step S2 for rectangular image data A2, the parameter obtaining unit does not prefetch dictionary data for step S3. At this time, the parameter holding units hold the parameters for steps S1 and S2. Since the result of processing A2(S2) is FALSE but the parameters for step S1 are held, processing A3(S1) can continuously start for rectangular image data A3.

Unlike the cache method of Conventional Example 2, if the processing result coincides with the prefetch determination result, the processing does not stop to wait for a dictionary load operation in this embodiment, as described above. Furthermore, unlike the prefetch method of Conventional Example 3, it is not necessary to reload dictionary data necessary for a next operation, which is caused by stop of the processing while needless dictionary data is loaded or overwriting of necessary dictionary data by always executing a prefetch operation. In this embodiment, since it takes 12 cycles to complete processing A3(S3), it is found that the processing time decreases by five cycles as compared with Conventional Example 1, by two cycles as compared with the cache method of Conventional Example 2, and by 11 cycles as compared with the prefetch method of Conventional Example 3.

Figure 3:
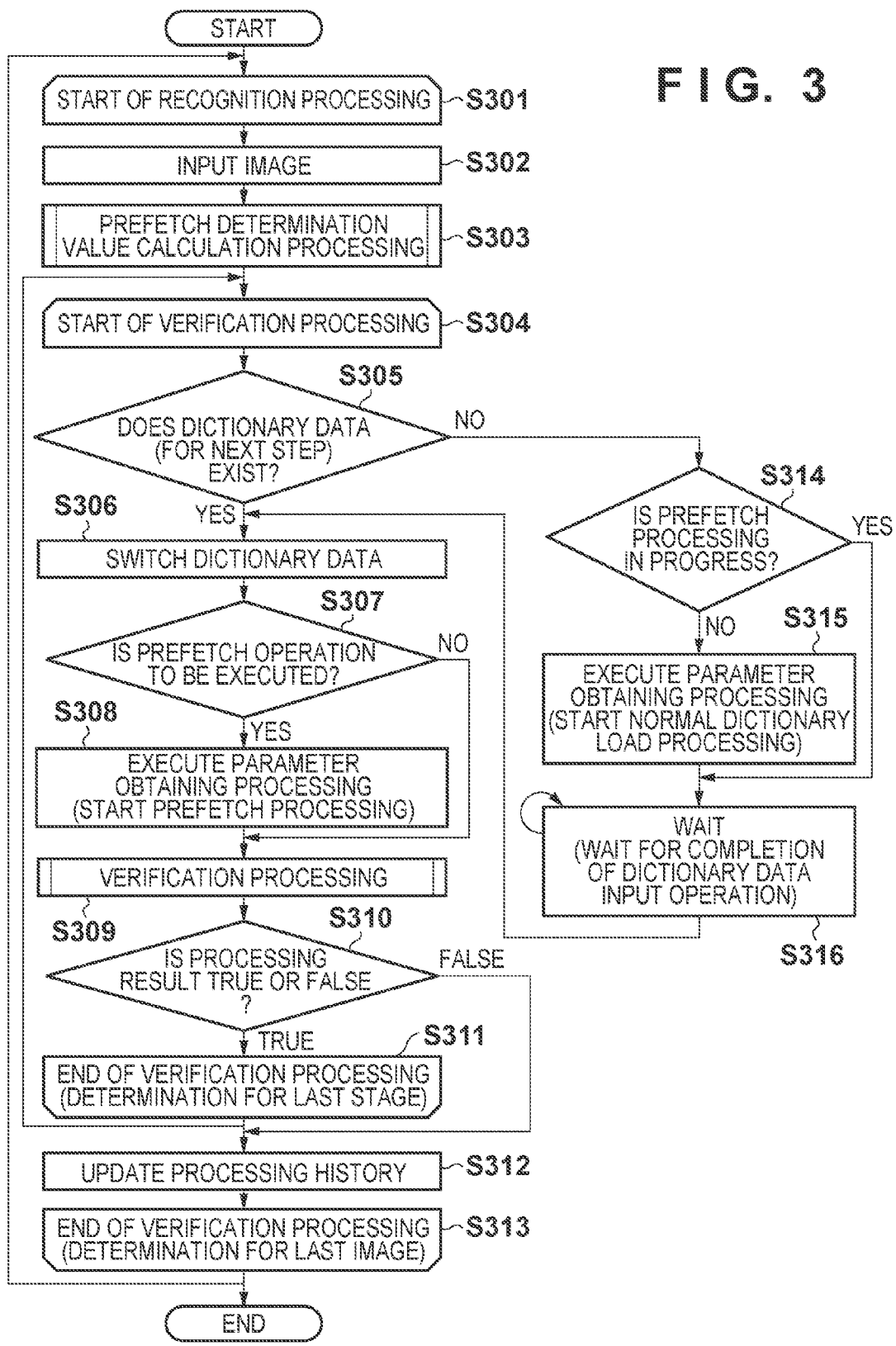
FIG. 3 is a flowchart illustrating a processing procedure according to the first embodiment.

The processing procedure of this embodiment will be described in detail with reference to a flowchart shown in FIG. 3.

The recognition processing is executed by loop processing in steps S301 to S313.

When the recognition processing starts in step S301, rectangular image data extracted (or addressed) from an input image is input in step S302. In step S303, the prefetch determination unit 1057 executes prefetch determination value calculation processing for the input rectangular image data. In the prefetch determination value calculation processing, a step until which a prefetch operation is executed for the rectangular image data is determined. In this example, the prefetch determination unit 1057 determines to execute a prefetch operation up to the last step processing in which the processing result of the rectangular image data of the immediately preceding frame is TRUE.

Upon completion of the prefetch determination value calculation processing, step processes are sequentially executed in steps S304 to S311.

In the step processing, in step S305, the prefetch determination unit 1057 determines whether there are parameters SY for step processing Y. If the determination result is YES, the parameter obtaining unit 1054 sends a parameter switching instruction to the parameter switching unit 1081 to switch parameters in step S306. This switching operation enables the calculation unit 1080 to perform calculation using parameters SY necessary for the processing in step Y.

If the determination result in step S305 is NO, the prefetch determination unit 1057 determines in step S314 whether prefetch processing is in progress. If the determination result in step S314 is YES, completion of the prefetch processing is awaited in step S316. If the determination result in step S314 is NO, the parameter obtaining unit 1054 obtains the parameters in step S315, and completion of the parameter obtaining processing is awaited in step S316. The parameter obtaining processing in step S315 is not parameter prefetch processing but normal parameter load processing. When the prefetch processing or the parameter obtaining processing by the parameter load processing is complete in step S316, the parameter obtaining unit 1054 sends a parameter switching instruction to switch parameters in step S306. This switching operation enables the calculation unit 1080 to perform calculation using parameters SY necessary for the step processing.

The prefetch determination unit 1057 then determines in step S307 whether to prefetch parameters SY+1 for next step Y+1. The determination value obtained in step S303 is used to make a determination. If the step number Y+1 of the next step is equal to or smaller than the determination value obtained in step S303, the unit 1057 determines to prefetch the parameters.

If YES is determined (it is determined to perform a prefetch operation) in step S307, the parameter obtaining unit 1054 sends a parameter (input) request to start prefetch processing for the parameters necessary for the next step in step S308. After sending the parameter (input) request, verification processing starts in step S309.

If NO is determined (it is determined not to perform a prefetch operation) in step S307, verification processing in step S309 starts without executing the prefetch processing in step S308.

Upon completion of the verification processing, it is determined in step S310 whether the result of the verification processing is TRUE or FALSE. If the result is TRUE, it is determined in step S311 whether the step processing of the last stage is complete. If it is not determined in step S311 that the step processing of the last stage is complete, the process returns to step S304 to execute next step processing. If it is determined in step S311 that the step processing of the last stage is complete or if it is determined in step S310 that the processing result is FALSE, a processing history is updated in step S312. The calculation unit 1080 then determines in step S313 whether the last rectangular image data is processed. If it is not determined in step S313 that the processing of the last rectangular image data is complete, the process returns to S301 to process next rectangular image data. If it is determined in step S313 that the processing of the last rectangular image data is complete, the recognition processing ends.

In this embodiment, a prefetch operation is controlled using a processing history for the pattern of a preceding frame of a moving image. If, therefore, patterns have a high correlation between processing histories, it is possible to implement a prefetch operation for effective dictionary transfer based on the pattern correlation.

Second Embodiment

A data processing apparatus according to the second embodiment of the present invention will be described. Although a block diagram showing the data processing apparatus according to the second embodiment of the present invention is the same as that showing the data processing apparatus according to the first embodiment, the operation of a prefetch determination unit 1057 is different from that in the first embodiment.

The prefetch determination unit 1057 of the first embodiment refers to the processing result of the preceding frame of rectangular image data currently processed in the processing history holding unit 1058, and outputs, as a determination result, the processing result intact to the parameter obtaining unit 1054.

To the contrary, the prefetch determination unit 1057 of the second embodiment refers to the processing results of the preceding frames of regions adjacent to rectangular image data currently processed, obtains the average value of the processing results, and outputs the average value as a determination result to a parameter obtaining unit 1054.

As an example, a case in which the processing results of regions immediately adjacent to the rectangular image data currently processed is considered as a determination result will be described. Assume that the address of the rectangular image data currently processed is represented by (X, Y). Note that X represents a position in the line direction of the rectangular image data in the input image, and Y represents a position in the column direction of the rectangular image data in the input image. The prefetch determination unit 1057 refers to the processing results of the rectangular image data, indicated by the following nine addresses, of the preceding frames in a processing history holding unit 1058.

(X−1, Y−1), (X, Y−1), (X+1, Y−1),
(X−1, Y), (X, Y), (X+1, Y),
(X−1, Y+1), (X, Y+1), (X+1, Y+1)

To obtain an average processing result of the immediately adjacent regions, the prefetch determination unit 1057 divides, by nine, the sum of the nine processing results which have been referred to. Note that it may be impossible to obtain the processing results of nine pixels near the edges of the input image. In this case, it is possible to obtain an average processing result by dividing the sum of obtainable processing results by the number of obtainable processing results. Furthermore, the division result may have a remainder. In this case, the obtained result may be rounded off, rounded down, or rounded up.

The prefetch determination unit 1057 outputs the obtained average processing result to the parameter obtaining unit 1054, which then prefetches parameters for up to the step of the input average processing result.

Third Embodiment

Figure 4:
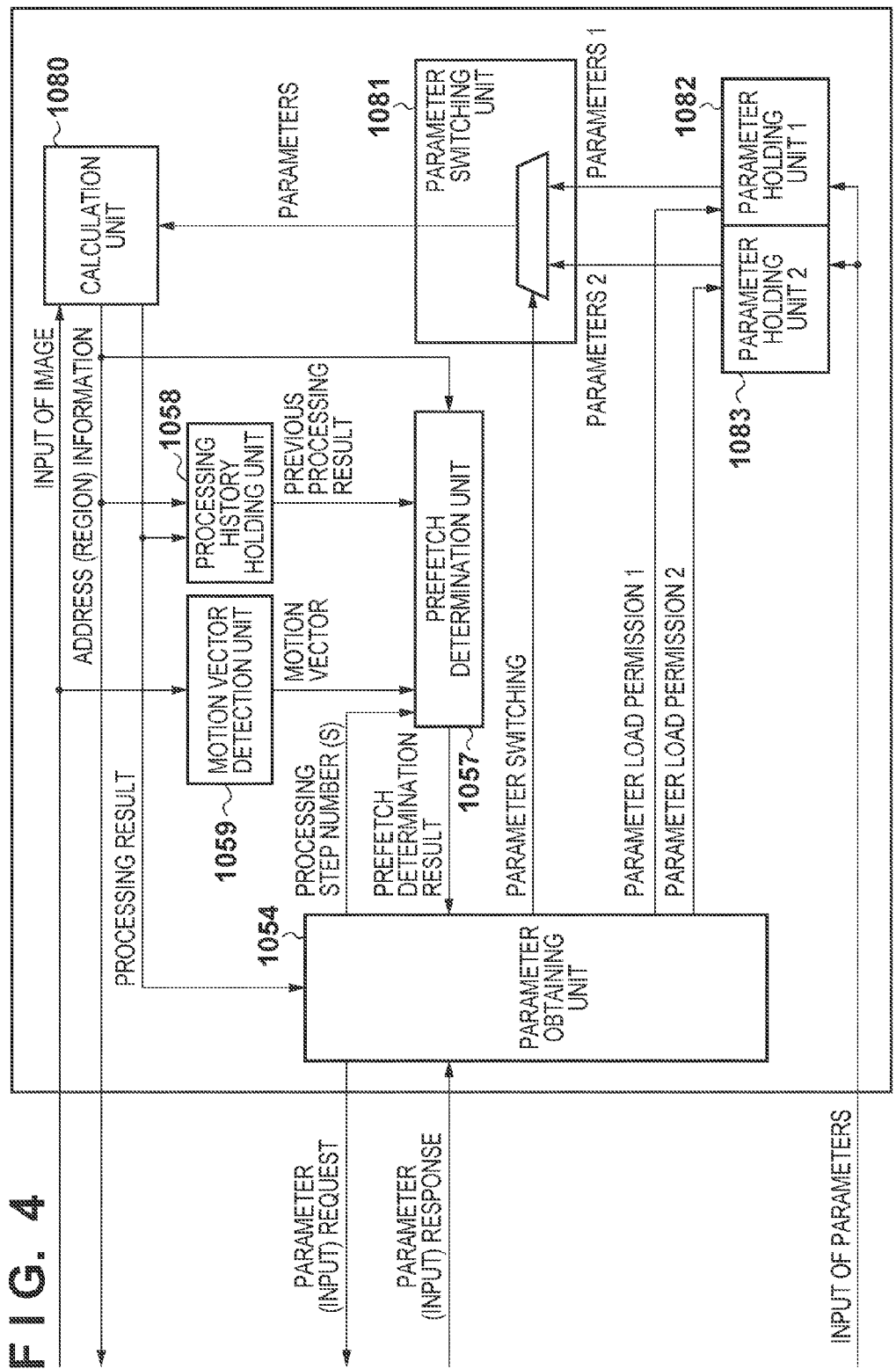
FIG. 4 is a view showing the schematic configuration of a data processing apparatus according to the third embodiment.

A data processing apparatus according to the third embodiment of the present invention will be described with reference to a block diagram shown in FIG. 4. The configuration of the data processing apparatus shown in FIG. 4 is obtained by adding a motion vector detection unit 1059 to the configuration of the data processing apparatus of the first embodiment of the present invention shown in FIG. 1.

The motion vector detection unit 1059 detects a motion vector indicating a change in position of a target object for each pixel between frame images (input data). The direction and magnitude of a motion vector for each pixel are obtained as a detection result. For example, if a change in position is +2 in the X direction of the image and −1 in the Y direction of the image, a motion vector represented by (+2, −1) is obtained.

A prefetch determination unit 1057 refers to the motion vector of rectangular image data currently processed in the motion vector detection unit 1059. Furthermore, to refer to the processing result of the preceding frame held in a processing history holding unit 1058, an offset is added to a reference destination address using the motion vector which has been referred to. Assume that the address of the rectangular image data currently processed is represented by (X, Y) and a motion vector in the region is represented by (+2, −1). In this case, the address added with an offset is represented by (X−2, Y+1). To refer to the processing result of the preceding frame in the processing history holding unit 1058, the address (X−2, Y+1) which has been added with the offset is used. That is, a reference destination is changed to more appropriate region.

The prefetch determination unit 1057 outputs the processing result of the obtained address with the offset to a parameter obtaining unit 1054, which then prefetches parameters for up to the step of the processing result of the input address with the offset.

According to this embodiment, it becomes possible to perform compensation for the motion of an object by adding an offset to a reference destination address using a motion vector, thereby achieving high-accuracy prediction. Especially when processing is executed by thinning out frames or an object having a high moving speed is recognized, the correlation between frames becomes low and, therefore, motion compensation according to this embodiment is effective.

Fourth Embodiment

A data processing apparatus according to the fourth embodiment of the present invention will be described. While the data processing apparatus according to the first embodiment of the present invention processes a moving image, the data processing apparatus according to the fourth embodiment processes a still image. Although a block diagram showing the data processing apparatus according to the fourth embodiment is the same as that showing the data processing apparatus according to the first embodiment, an input image is a still image in the fourth embodiment. Furthermore, information registered and held in a processing history holding unit 1058 and the operation of a prefetch determination unit 1057 are different from those in the first embodiment.

The processing history holding unit 1058 will be described first. The processing history holding unit 1058 of the first embodiment holds the processing results of the preceding frame and the current frame. To the contrary, since an input image to the data processing apparatus of the fourth embodiment is a still image, the processing history holding unit 1058 of the fourth embodiment holds the processing result of rectangular image data which has been processed immediately before rectangular image data currently processed. The processing result includes the address information of a processed region and the last step number in which the result of the processing of the region is TRUE. The address information of a region is different from that in the first embodiment, and includes only information for identifying rectangular image data within the still image.

If, for example, the address of the rectangular image data currently processed is (X, Y), the processing history holding unit 1058 holds the processing result of rectangular image data having an address (X−1,Y). Note that if X=0, the address of rectangular image data processed immediately before the current data is (Xmax−1, Y−1), and the unit 1058 holds the processing result of the rectangular image data having the address (Xmax−1, Y−1). Note that Xmax represents the image size in the X direction.

The prefetch determination unit 1057 will now be described. The prefetch determination unit 1057 of the fourth embodiment refers to the processing result of the rectangular image data processed immediately before the rectangular image data currently processed, which is held in the processing history holding unit 1058.

If, for example, the address of the rectangular image data currently processed is (X, Y), the unit 1057 refers to the processing result of the rectangular image data having the address (X−1,Y). Note that if X=0, the address of the rectangular image data processed immediately before the current data is (Xmax−1, Y−1) which is not adjacent to the address (X,Y) of the rectangular image data currently processed. The processing result of the rectangular image data which is not adjacent to the current data may not be similar to that of the current data. In this case, therefore, normal prefetch processing may be executed without referring to any processing result.

As a result of referring to the processing result, the last step number in which the result of the processing of the immediately preceding adjacent rectangular image data is TRUE is obtained. Furthermore, the prefetch determination unit 1057 receives a step number S currently processed from a parameter obtaining unit 1054, and compares a next step number S+1 with the step number obtained from the processing history holding unit 1058. If, as a result of the comparison, the next step number S+1 is equal to or smaller than the step number obtained from the processing history holding unit 1058, it is determined to execute a prefetch operation. The determination result is output to the parameter obtaining unit 1054.

In response to the determination result of the prefetch determination unit 1057, the parameter obtaining unit 1054 prefetches parameters for up to the last step in which the result of the processing of the immediately preceding rectangular image data is TRUE.

As described above, for recognition processing using a still image, the processing result of rectangular image data currently processed is very similar to that of its adjacent rectangular image data. That is, the processing result of the rectangular image data currently processed is probably TRUE up to a step in which the processing result of the adjacent rectangular image data is TRUE. It is, therefore, possible to decrease the number of needless prefetch operations by prefetching dictionary data for up to a step in which the result of the preceding step is TRUE.

Fifth Embodiment

A data processing apparatus according to the fifth embodiment of the present invention will be described. In the data processing apparatus according to the fifth embodiment of the present invention, information held in a processing history holding unit 1058 and the operation of a prefetch determination unit 1057 are different from those in the fourth embodiment.

The processing history holding unit 1058 will be described first. The processing history holding unit 1058 of the fourth embodiment holds the processing result of rectangular image data processed immediately before rectangular image data currently processed. To the contrary, the processing history holding unit 1058 of the fifth embodiment holds the processing results from rectangular image data directly above rectangular image data currently processed to the immediately preceding rectangular image data.

If, for example, the address of the rectangular image data currently processed is (X, Y), the processing history holding unit 1058 holds the processing result of a plurality of rectangular image data having addresses (X, Y−1), (X+1, Y−1), . . . , (Xmax−1, Y−1), (0, Y), (1, Y), . . . , (X−1, Y).

The prefetch determination unit 1057 will now be described. The prefetch determination unit 1057 of the fifth embodiment refers to the processing result of the rectangular image data directly above the rectangular image data currently processed.

If, for example, the address of the rectangular image data currently processed is (X, Y), the unit 1057 refers to the processing result of the rectangular image data having the address (X, Y−1). Note that if Y=0, there is no processing result of rectangular image data directly above the current data. In this case, normal prefetch processing may be executed without referring to any processing result.

As a result of referring to the processing result, the last step number in which the result of the processing of the rectangular image data immediately above the current data is TRUE is obtained. Furthermore, the prefetch determination unit 1057 receives a step number S currently processed from a parameter obtaining unit 1054, and compares a next step number S+1 with a step number obtained from the processing history holding unit 1058. If, as a result of the comparison, the next step number S+1 is equal to or smaller than the step number obtained from the processing history holding unit 1058, it is determined to execute a prefetch operation.

In response to the determination result of the prefetch determination unit 1057, the parameter obtaining unit 1054 prefetches parameters for up to the last step in which the result of the processing of the rectangular image data directly above the current data is TRUE.

Sixth Embodiment

A data processing apparatus according to the sixth embodiment of the present invention will be described. In the data processing apparatus according to the sixth embodiment of the present invention, the operation of a prefetch determination unit 1057 is different from that in the fifth embodiment.

The prefetch determination unit 1057 of the fifth embodiment refers to the processing result of the rectangular image data directly above the rectangular image data currently processed. To the contrary, the prefetch determination unit of the sixth embodiment refers to the processing results of a plurality of rectangular image data adjacent to rectangular image data currently processed, and executes determination processing using the average value of the processing results.

If, for example, the address of the rectangular image data currently processed is (X, Y), the prefetch determination unit 1057 refers to the processing results of rectangular image data indicated by the following four addresses in a processing history holding unit 1058.

(X−1, Y−1), (X, Y−1), (X+1, Y−1), (X−1, Y)

To obtain the average processing result of the immediately adjacent regions, the sum of the four processing results which have been referred to is divided by four. Note that it may be impossible to obtain processing results for four pixels near the edges of an input image at X=0 or Y=0. In this case, it is possible to obtain an average processing result by dividing the sum of obtainable processing results by the number of obtainable processing results. Furthermore, the division result may have a remainder. In this case, the obtained result may be rounded off, rounded down, or rounded up. No processing result is obtained at a processing start address which is X=0 and Y=0. In this case, normal prefetch processing may be executed without referring to any processing result.

As a result of referring to the processing result, the average value of last step numbers (largest step numbers) in which the result of the processing of the rectangular image data of an adjacent region is TRUE is obtained. Furthermore, the prefetch determination unit 1057 receives a step number S currently processed from a parameter obtaining unit 1054, and compares a next step number S+1 with the calculated average step number. If, as a result of the comparison, the next step number S+1 is equal to or smaller than the calculated average step number (the average value of the largest step numbers), it is determined to execute a prefetch operation.

In response to the determination result of the prefetch determination unit 1057, the parameter obtaining unit 1054 prefetches parameters for up to the average step of the last steps in which the result of the processing of the rectangular image data of an adjacent region is TRUE.

Although this embodiment shows a case in which the processing results of the immediately adjacent rectangular image data are used, an average value may be obtained using the processing results of a plurality of rectangular image data which are not immediately adjacent to but close to the current data. In this case, the processing history holding unit 1058 needs to hold the necessary processing results of rectangular image data close to the current data.

Seventh Embodiment

Although the fourth, fifth, and sixth embodiments have been described using a still image, any of them is also applicable to a moving image. In the first embodiment, the processing history holding unit 1058 holds the processing result of a frame preceding that currently processed. To the contrary, if the same processing as that for a still image which has been described in the fourth, fifth, and sixth embodiments is executed for a moving image, the processing history holding unit 1058 need only hold the processing result of the current frame.

Eighth Embodiment

Although the parameter holding unit 1082 and parameter holding unit 1083 are explicitly described as separate units in the above embodiments, they may be implemented in separate areas in one parameter holding unit.

Although the recognition processing has been exemplified, the present invention may be implemented for any processing other than the recognition processing as long as there is the temporal or spatial correlation between processing histories. Even for processing other than the recognition processing, it is possible to decrease the number of needless prefetch operations when the prefetch determination unit 1057 uses the temporal or spatial correlation between processing histories to determine whether to prefetch dictionary data.

As described above, according to each of the above-described embodiments, it is possible to decrease the number of needless prefetch operations, and to shorten a waiting time due to a parameter load operation, thereby achieving high-speed processing while suppressing the circuit scale of an internal memory.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-110825 filed on May 17, 2011, which is hereby incorporated by reference herein in its entirety.

What is claimed is:

1. A data processing apparatus which sequentially executes at least one of a plurality of verification processes for each of a plurality of predetermined regions in an input image by referring to dictionary data for respective verification processes so as to recognize a target object in the image, comprising:

an obtaining unit configured to obtain dictionary data to be referred to in the verification process;

a holding unit configured to hold a plurality of dictionary data obtained by said obtaining unit;

a verification unit configured to execute one of the verification processes for each of the predetermined regions by referring to one dictionary data held in said holding unit;

a history holding unit configured to hold a verification result for a region of interest in the predetermined regions of the input image obtained by said verification unit;

a prefetch determination unit configured to determine for a region of interest in the predetermined regions of the input image based on the verification result for a region in the predetermined regions of the input image adjacent to the region of interest held in said history holding unit whether to execute prefetch processing in which said obtaining unit obtains in advance dictionary data to be referred to by said verification unit in a succeeding verification process, and holds the dictionary data in said holding unit before the succeeding verification process; and a processing unit configured to execute, when it has been determined to execute the prefetch processing, the prefetch processing.

2. The apparatus according to claim 1, wherein said verification unit sequentially executes verification processes corresponding to respective step numbers for each of the predetermined regions of the input image in the order of step number, and executes, when the target object is determined as a result of executing a verification process corresponding to one step number, a verification process corresponding to a next step number.

3. The apparatus according to claim 2, wherein the verification result held in said history holding unit indicates a largest step number in which the target object is determined as a result of a verification process for a region of the input image other than a region of the input image currently undergoing a verification process, and when a next step number of a step number of the region of interest in the input image currently undergoing the verification process is not larger than the largest step number held in said history holding unit, said prefetch determination unit determines to execute the prefetch processing.

4. The apparatus according to claim 3, wherein when the next step number of the step number of the predetermined region of the input data currently undergoing the verification process is not larger than an average value of largest step numbers of a plurality of predetermined regions of the preceding input data, said prefetch determination unit determines to execute the prefetch processing.

5. The apparatus according to claim 1, further comprising a detection unit configured to detect a motion vector indicating a change in position of the target object between input data, wherein to refer to the verification result held in said history holding unit, said prefetch determination unit changes a predetermined region as a reference destination for preceding input data based on a detection result of said detection unit.

6. The apparatus according to claim 1, wherein the input image is a frame image forming a moving image.

7. The apparatus according to claim 2, wherein the verification result held in said history holding unit indicates a largest step number in which the target object is determined as a result of a verification process for a predetermined region which has undergone a verification process for one input data, and when a next step number of a step number of a predetermined region currently undergoing a verification process is not larger than the largest step number held in said history holding unit, said prefetch determination unit determines to execute the prefetch processing.

8. The apparatus according to claim 7, wherein the verification result held in said history holding unit indicates each largest step number in which the target object is determined as a result of a verification process for a plurality of predetermined regions which have undergone a verification process for one input data, and when a next step number of a step number of a predetermined region of input data currently undergoing a verification process is not larger than an average value of the largest step numbers for the plurality of predetermined regions of the input data, which are held in said history holding unit, said prefetch determination unit determines to execute the prefetch processing.

9. The apparatus according to claim 7, wherein the input data is a still image.

10. A control method for a data processing apparatus which includes a holding unit configured to hold a plurality of dictionary data and a history holding unit, and sequentially executes at least one of a plurality of verification processes for each of a plurality of predetermined regions in an input image by referring to dictionary data for respective verification processes so as to recognize a target object in the image, the method comprising:

obtaining dictionary data to be referred to in the verification process;

executing one of the verification processes for each of the predetermined regions by referring to one dictionary data held in the holding unit, and registering a verification result for a region of interest in the predetermined regions of the input image in the history holding unit;

determining for a region of interest in the predetermined regions of the input image based on the verification result for a region in the predetermined regions of the input image adjacent to the region of interest held in the history holding unit whether to execute prefetch processing in which dictionary data to be referred to in a succeeding verification process in the executing the verification process is obtained in advance in the obtaining, and is held in the holding unit before the succeeding verification process; and executing, when it has been determined to execute the prefetch processing, the prefetch processing.

11. A non-transitory computer-readable storage medium storing a computer program for causing a computer to execute each step of a control method for a data processing apparatus according to claim 10.

12. The apparatus according to claim 1, wherein said history holding unit holds a verification result for a region which has been processed immediately before a currently processed region.

13. The apparatus according to claim 1, wherein said history holding unit holds verification results from a region directly above a currently processed region to a region which has been processed immediately before the currently processed region, and said prefetch determination unit refers to a verification result for the region directly above the currently processed region.

14. The apparatus according to claim 1, wherein said history holding unit holds verification results from a region directly above a currently processed region to a region which has been processed immediately before the currently processed region, and said prefetch determination unit refers respective verification results for a plurality of regions adjacent to the currently processed region and performs a determination based on an average value of the respective verification results.

* * * * *